United States Patent
Tokizawa

(10) Patent No.: US 7,956,507 B2
(45) Date of Patent: Jun. 7, 2011

(54) ROTOR FOR ROTATING ELECTRICAL MACHINE AND METHOD OF MANUFACTURING SAME

(75) Inventor: Takashi Tokizawa, Nagoya (JP)

(73) Assignee: Denso Corporation, Kariya (JP)

(*) Notice: Subject to any disclaimer, the term of this patent is extended or adjusted under 35 U.S.C. 154(b) by 294 days.

(21) Appl. No.: 12/382,612

(22) Filed: Mar. 19, 2009

(65) Prior Publication Data
US 2009/0236926 A1 Sep. 24, 2009

(30) Foreign Application Priority Data
Mar. 19, 2008 (JP) ................................. 2008-071049

(51) Int. Cl.
H02K 19/26 (2006.01)
H02K 11/00 (2006.01)
H02K 3/46 (2006.01)
H02K 1/28 (2006.01)
H02K 15/02 (2006.01)
H01F 7/06 (2006.01)

(52) U.S. Cl. .......... 310/194; 310/71; 310/180; 310/181; 310/260; 310/263; 310/270; 29/598; 29/605; 29/606

(58) Field of Classification Search ............ 310/71, 310/180, 181, 194, 260, 263, 270; 29/598, 29/605, 606
See application file for complete search history.

(56) References Cited

U.S. PATENT DOCUMENTS

| 4,339,873 | A | 7/1982 | Kanamaru et al. |
| 4,377,762 | A | 3/1983 | Tatsumi et al. |
| 6,008,813 | A | 12/1999 | Lauer et al. |
| 6,114,786 | A | 9/2000 | Ishida et al. |
| 6,172,434 | B1 | 1/2001 | Oohashi et al. |
| 6,219,061 | B1 | 4/2001 | Lauer et al. |
| 6,243,098 | B1 | 6/2001 | Lauer et al. |
| 6,262,740 | B1 | 7/2001 | Lauer et al. |
| 6,784,577 | B2 | 8/2004 | Kondo |
| 2007/0294878 | A1 | 12/2007 | Tokizawa |

FOREIGN PATENT DOCUMENTS
JP        A-56-98349        8/1981
(Continued)

OTHER PUBLICATIONS
Machine Translation JP2002335661 (2002) and JP2000125528 (2000).*

*Primary Examiner* — Quyen Leung
*Assistant Examiner* — Jose A Gonzalez Quinones
(74) *Attorney, Agent, or Firm* — Oliff & Berridge, PLC

(57) ABSTRACT

In a rotor for a rotating electrical machine, a flange of an insulating bobbin is formed with a first hook portion and a second hook portion. The first hook portion directs a lead of a field coil both against the winding direction of the field coil and radially inward. The first hook portion has a first groove in which is hooked a proximal portion of the lead. The second hook portion directs the lead axially outward. The second hook portion has a second groove which has an open end on a radially inner periphery of the second hook portion, a closed end positioned radially outward of the open end, and a neck between the open and closed ends. The second hook portion has an intermediate portion of the lead hooked in the second groove between the neck and closed end of the second groove.

28 Claims, 13 Drawing Sheets

FOREIGN PATENT DOCUMENTS

| | | |
|---|---|---|
| JP | A-11-220845 | 8/1999 |
| JP | 2000125528 A * | 4/2000 |
| JP | A-2000-125528 | 4/2000 |
| JP | A-2001-34780 | 2/2001 |
| JP | A-2001-37180 | 2/2001 |
| JP | 2002335661 A * | 11/2002 |
| JP | A-2002-335661 | 11/2002 |
| JP | A-2008-29192 | 2/2008 |

* cited by examiner

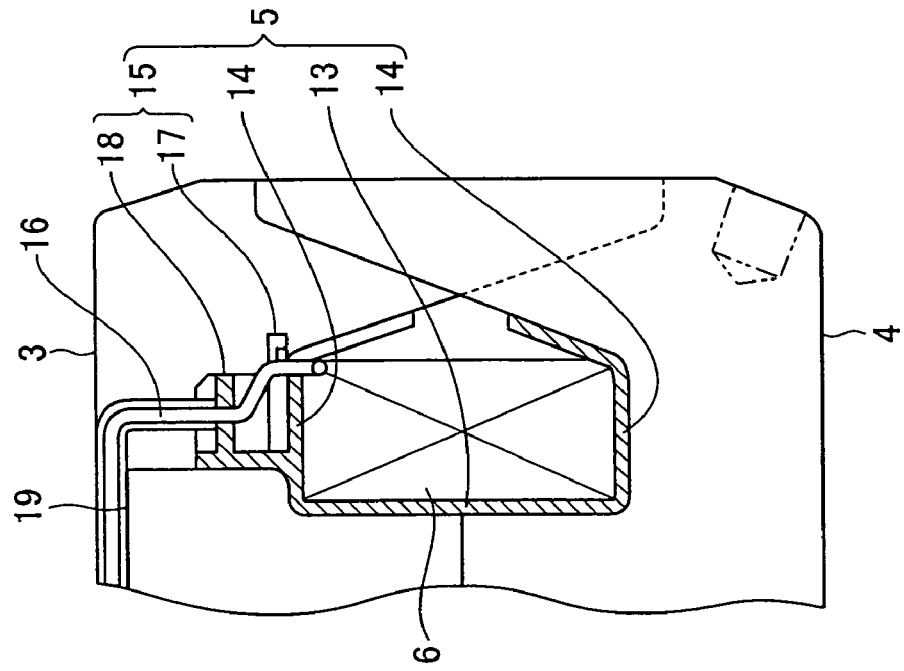
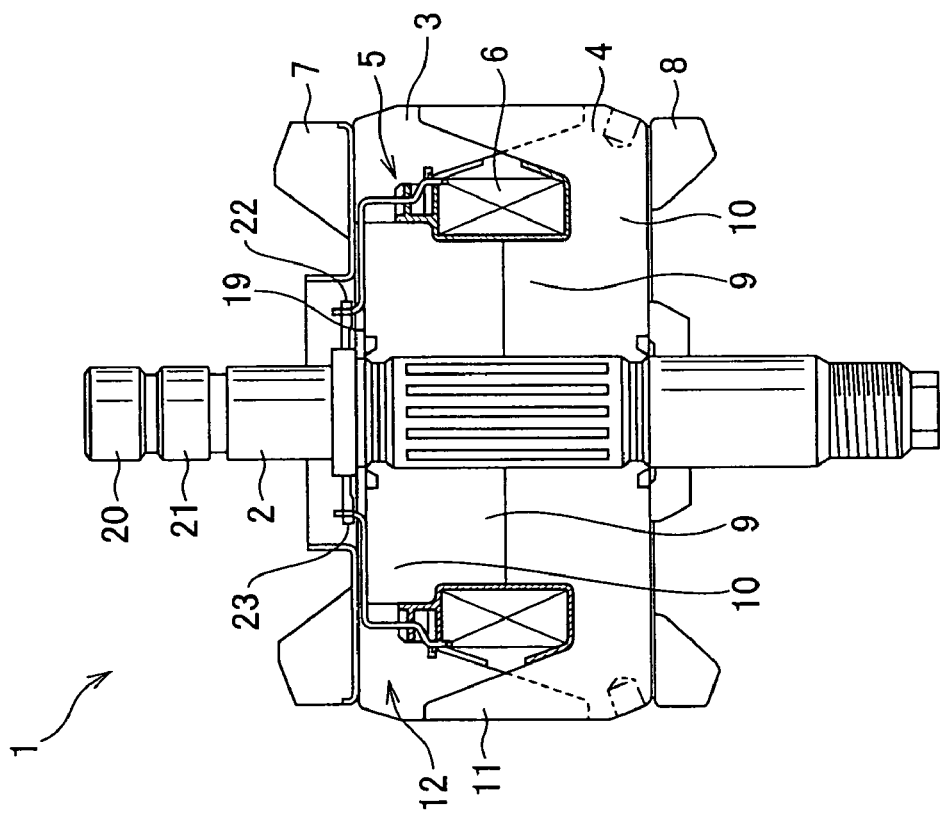

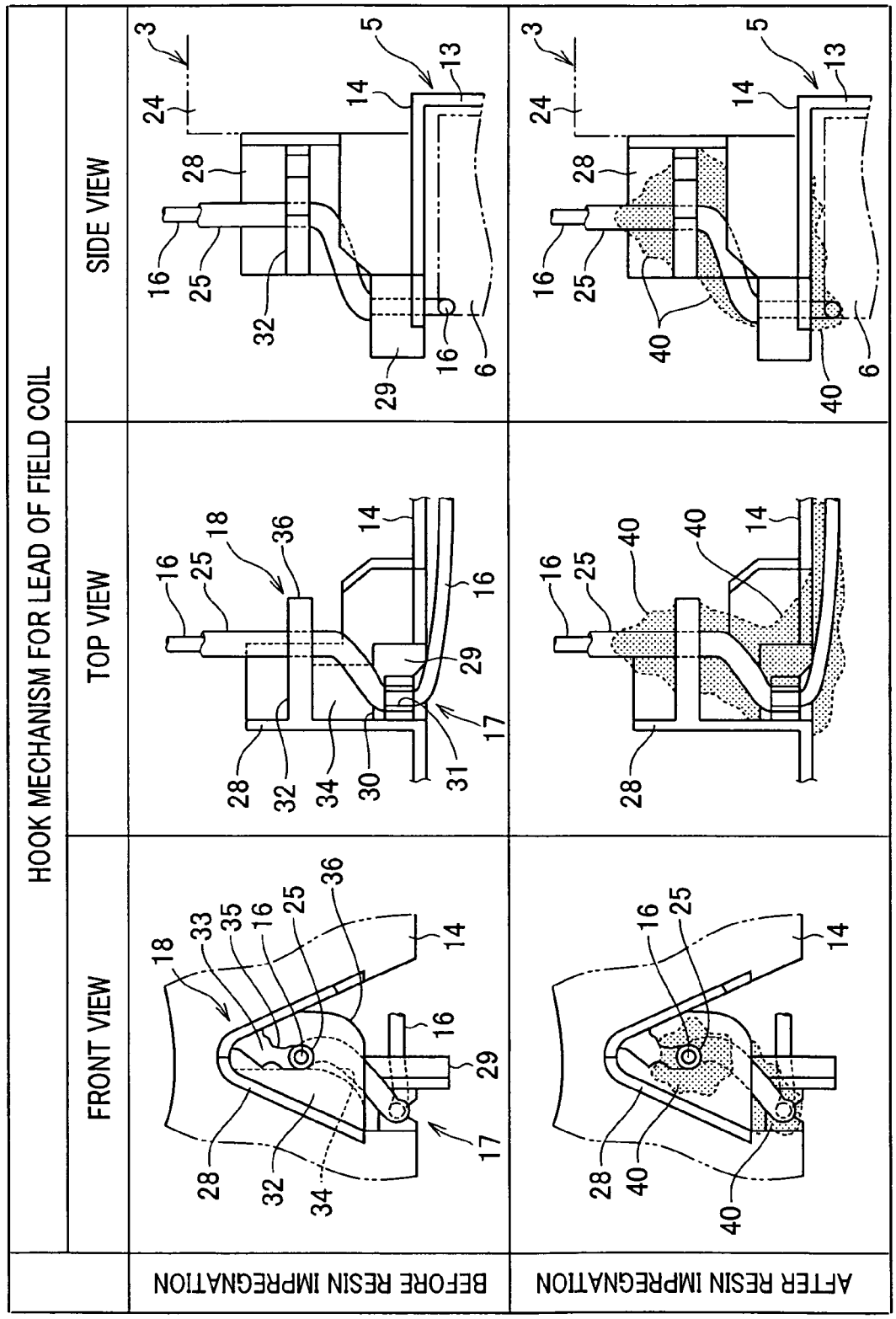

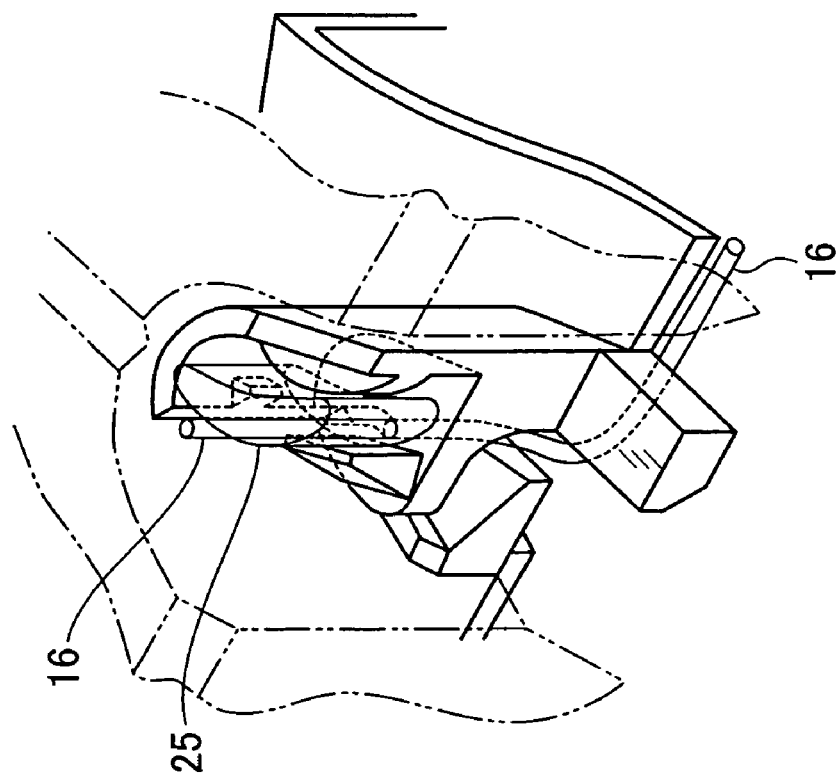
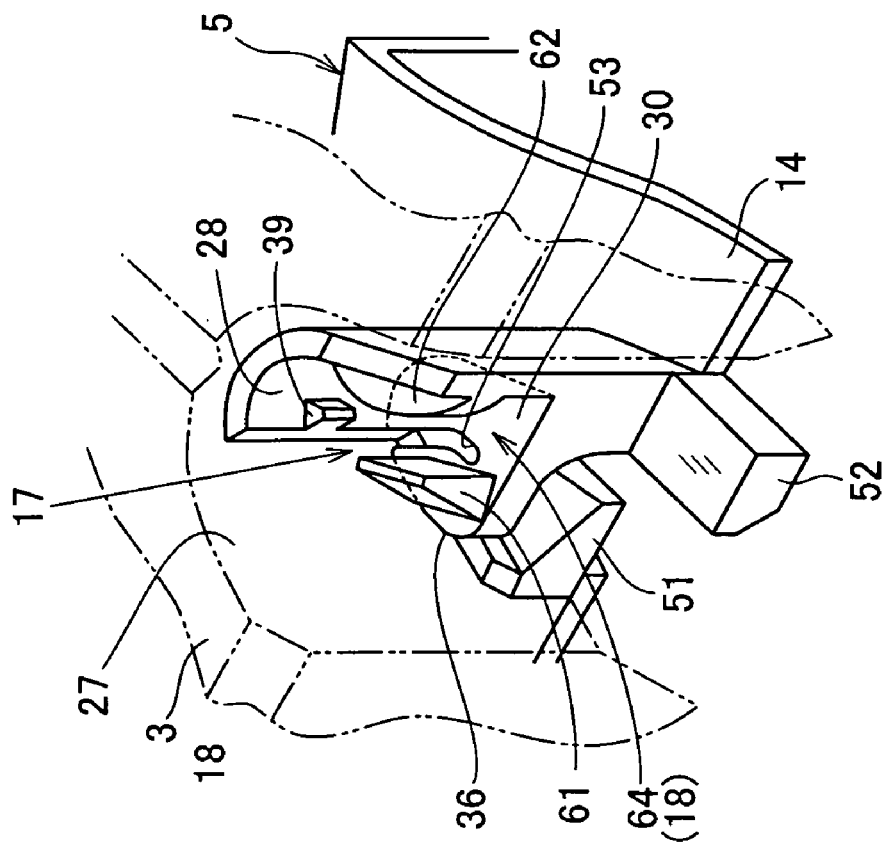

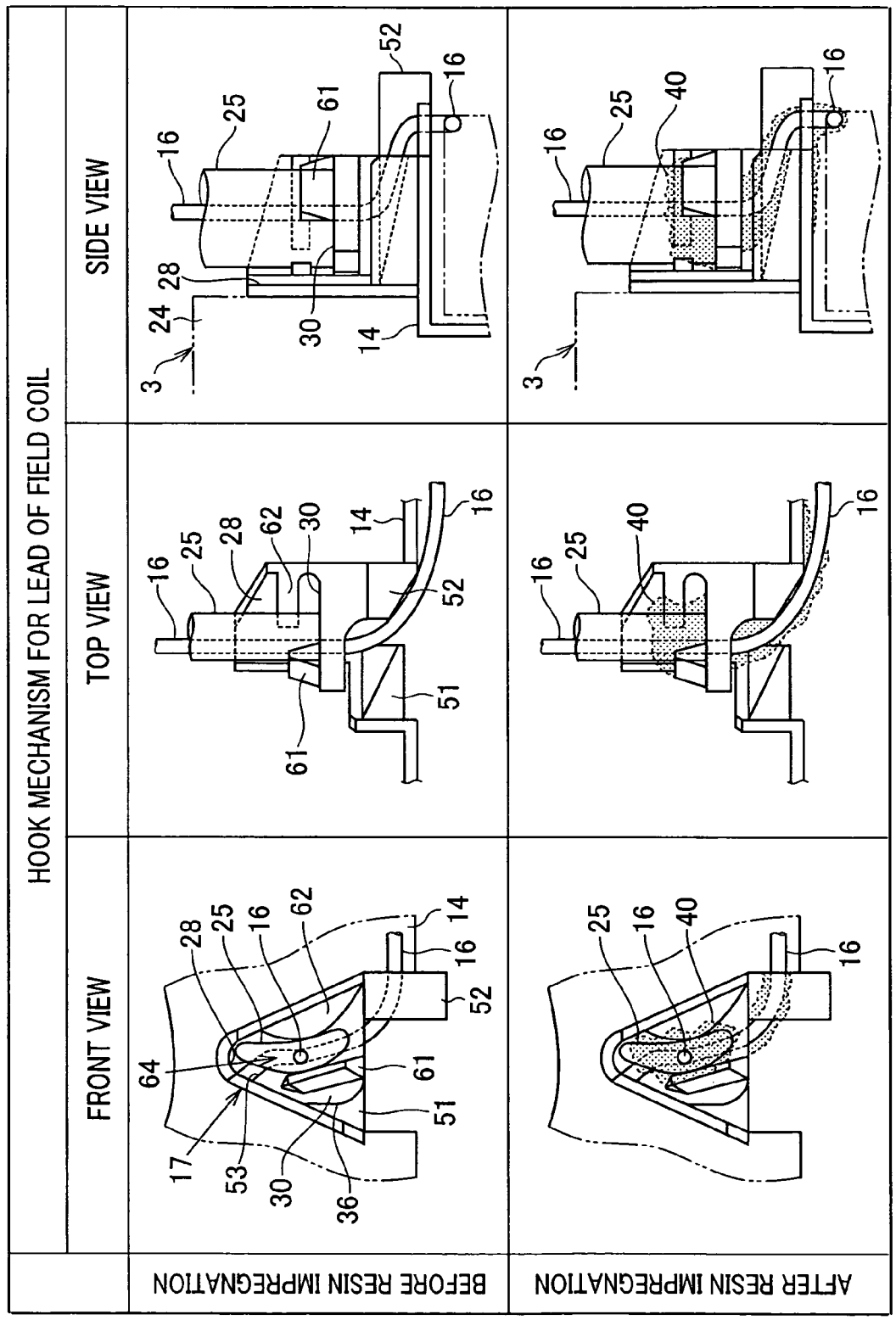

ROTOR FOR ROTATING ELECTRICAL MACHINE AND METHOD OF MANUFACTURING SAME

CROSS-REFERENCE TO RELATED APPLICATION

This application is based on and claims priority from Japanese Patent Application No. 2008-71049, filed on Mar. 19, 2008, the content of which is hereby incorporated by reference in its entirety into this application.

BACKGROUND OF THE INVENTION

1. Technical Field of the Invention

The present invention relates generally to rotors for rotating electrical machines, such as electric generators and motors, and methods of manufacturing the rotors.

More particularly, the invention relates to rotors for automotive alternators, which include Lundell-type pole cores as rotor cores, and their manufacturing methods.

2. Description of the Related Art

Conventionally, a rotor for an automotive alternator generally includes a pair of Lundell-type pole cores as rotor cores. The pole cores are press-fit on a shaft of the rotor so that they are opposed to each other in the axial direction of the shaft, forming a hollow space therebetween. The rotor further includes a field coil that is received in the space formed between the pole cores, and fit on the shaft via an insulating bobbin.

The insulating bobbin has a cylindrical body and a pair of flanges. The body is fit on the pole cores, and has the field coil wound thereon. The flanges extend radially outward from opposite axial ends of the body, respectively. Moreover, one of the flanges has securing portions integrally formed therewith for securing (or hooking) both a winding start lead and a winding end lead of the filed coil, so as to prevent the field coil from being loosened.

There have been proposed various structures of the securing portions for securing the leads of the field coil, such as those disclosed in Japanese Patent First Publications No. 2001-37180, No. 2002-335661, and No. 2000-125528, English equivalents of which are respectively U.S. Pat. Nos. 6,172,434, 6,784,577, and 6,114,786.

For example, FIGS. 11A and 11B show part of a rotor 100 for an automotive alternator, which is disclosed in Japanese Patent First Publication No. 2001-37180.

As shown in FIG. 11A, the rotor 100 includes a shaft 101, a pair of Lundell-type pole cores 102 press-fit on the shaft 101, an insulating bobbin 103 fit on the pole cores 102, and a field coil 104 that is wound around the insulating bobbin 103 and received in a hollow space formed between the pole cores 102 along with the insulating bobbin 103. The insulating bobbin 103 has a cylindrical body 105, around which the field coil 104 is wound, and a pair of flanges 106 that extend radially outward from opposite axial ends of the body 105, respectively.

Moreover, one of the flanges 106 has a pair of stays 108 integrally formed therewith for respectively securing both the winding start and winding end leads 107 of the filed coil 104. The stays 108 are symmetrically formed with respect to the shaft 101, and have the same structure. Therefore, for the sake of simplicity, only one of the stays 108 which is used to secure (or hook) the winding end lead 107 of the field coil 104 will be described hereinafter with reference to FIGS. 11A and 11B.

The stay 108 is fit in a root portion 109 of a corresponding one of the pole cores 102; the root portion 109 is formed, between an adjacent pair of claw portions of the pole core 102, into a V-shaped groove. Moreover, the stay 108 is integrally formed with an E-shaped winder 110, around which a proximal portion of the lead 107 is wound. The lead 107 is then guided by a groove 111 formed in the stay 108, so as to extend in the axial direction of the shaft 11 along the surface of the root portion 109. After reaching an axial end face of the pole core 102, the lead 107 is further guided by a groove 112 formed in the axial end face, so as to extend radially inward to have its distal portion wound around a terminal (not shown); the terminal is electrically connected to a slip ring (not shown) provided on the shaft 101. Furthermore, an intermediate portion of the lead 107 is covered by an insulating tube 113, and the insulating tube 113 is bonded to both the root portion 109 and the groove 112 of the pole core 102 by an adhesive 114.

In operation of the alternator, the rotor 100 rotates about the shaft 101, creating a magnetic attraction between the pole cores 102 and a stator core (not shown) of the alternator. The magnetic attraction causes the pole cores 102 to vibrate. Further, with the vibration of the pole cores 102, the insulating bobbin 103 are repeatedly attached to and detached from the pole cores 102 in the axial direction of the shaft 101: Consequently, the lead 107 comes to receive, from the root portion 109 and a shoulder portion 115 of the pole core 102, both a centrifugal force and a repeated tensile force.

Further, since movement of the lead 107 is restricted by both the stay 108 and the insulating tube 113 that is bonded to the pole core 102, the tensile force will concentrate on a portion of the lead 107 between the stay 108 and the shoulder portion 115 of the pole core 102. As a result, the portion of the lead 107 may be broken due to the concentration of the tensile force thereon.

In addition, as illustrated in the fourth embodiment of Japanese Patent First Publication No. 2001-37180, the insulating tube 113 may be extended to cover all the portion of the lead 107 between the stay 108 of the insulating bobbin 103 and the shoulder portion 115 of the pole core 2, so as to relax the concentration of the tensile force on the portion. However, in this case, depending on the quality of applying the adhesive 114, the insulating tube 113 may be securely bonded to the pole core 102, but may not be securely bonded to the stay 108 of the insulating bobbin 103. As a result, it would be difficult to achieve the intended effect of relaxing the concentration of the tensile force on the portion of the lead 107.

FIG. 12A shows part of a rotor for an automotive alternator, which is disclosed in Japanese Patent First Publication No. 2002-335661. FIG. 12B shows part of a variation of the rotor of FIG. 12A. FIGS. 13A-13C together show hook portions formed in the rotor of FIG. 12A.

As shown in FIGS. 12A and 13A-13C, in the rotor, a flange 106 of an insulating bobbin is formed with a first hook portion 121 and a second hook portion 122. The first hook portion 121 is provided to direct a lead 107 of a field coil 104 to extend in an opposite direction to the winding direction of the field coil 104. The second hook portion 122 is provided to guide the lead 107.

The lead 107 extends from a winding portion of the field coil 104, and is bent by the first hook portion 121 at an acute angle. Thereafter, the lead 107 is guided by the second hook portion 122 to extend first radially inward and then axially outward. An insulating tube 113 is mounted on the lead 107 from a distal end of the lead 107 to the second hook portion 122. The insulating tube is further bonded to the second hook portion 122 by resin impregnation (i.e., adhesive) 114.

With the above configuration, it is possible to firmly secure the lead 107 by simply hooking it on the first and second hook portions 121 and 122. Further, since the lead 107 is bonded to the flange 106 by the resin impregnation 114, it is possible to reliably prevent the lead 107 from being loosened and from being broken due to a centrifugal force acting thereon during operation.

However, with the above configuration, is may be difficult to accurately mount the insulating tube 113 onto a desired section of the lead 107. Consequently, it may be difficult to secure a desired boding strength of the insulating tube 113 after applying the resin impregnation 114.

In addition, in the variation of the rotor shown in FIG. 12B, the insulating tube 113 is mounted on the lead 107 from the distal end of the lead 107 over the first hook portion 121. However, in even this case, it may still be difficult to accurately mount the insulating tube 113 onto a desired section of the lead 107; thus, it may be difficult to secure a desired bonding strength of the insulating tube 113 after applying the resin impregnation 114.

SUMMARY OF THE INVENTION

According to the present invention, there is provided a first rotor for a rotating electrical machine. The first rotor includes: 1) a shaft; 2) a pair of pole cores press-fit on the shaft; 3) a terminal provided on the shaft; 4) an insulating bobbin mounted on the pole cores, the insulating bobbin having a cylindrical body and a pair of flanges that extend radially outward from opposite axial ends of the body, respectively; and 5) a field coil having a winding portion and a lead, the winding portion being wound around the body of the insulating bobbin, the lead having a proximal portion, a distal portion, and an intermediate portion between the proximal and distal portions, the proximal portion extending from the winding portion of the field coil, the distal portion being connected to the terminal. Further, in the first rotor, one of the flanges of the insulating bobbin is formed with a first hook portion and a second hook portion. The first hook portion directs the lead both against a winding direction of the field coil and radially inward. The first hook portion has a first groove through which the lead extends. The first groove has its open end on a radially outer periphery of the first hook portion and its closed end positioned radially inward of the open end. The first hook portion has an end of the proximal portion of the lead, which is away from the winding portion of the field coil, hooked in the first groove. The second hook portion directs the lead axially outward. The second hook portion has a second groove through which the lead extends. The second groove has its open end on a radially inner periphery of the second hook portion, its closed end positioned radially outward of the open end, and a neck between the open and closed ends of the second groove. The second hook portion has part of the intermediate portion of the lead hooked in the second groove between the neck and closed end of the second groove.

With the above configuration, the lead can be easily and reliably hooked (or held) by the first and second hook portions. Consequently, it is possible to reliably prevent the lead from being loosened. Further, in operation of the rotating electrical machine, it is also possible to prevent the lead from being broken due to a centrifugal force and a repeated tensile force received from the pole cores.

According to a further implementation of the invention, the first rotor further includes an insulating tube that is put on the intermediate portion of the lead, and hooked in the second groove of the second hook portion along with the part of the intermediate portion. The neck of the second groove has a width that is less than an outside diameter of the insulating tube, but is greater than or equal to the sum of a diameter of the lead and twice a thickness of the insulating tube.

Specifying the width of the second groove as above, it is possible to push the insulating tube along with the intermediate portion of the lead into the inside of the second groove through the neck with deformation of the insulating tube. Moreover, once has been pushed into the inside of the second groove, it is difficult for the deformed insulating tube to get out through the neck. Consequently, the insulating tube can be kept at a fixed position, facilitating assembly of the rotor to the alternator.

In the first rotor, the one of the flanges is further formed with a guiding portion that guides the intermediate portion of the lead to extend from the first hook portion to the second hook portion with contact between the guiding portion and the intermediate portion.

With the guiding portion, the lead can be easily hooked to the second hook portion. Moreover, the contacting area between the lead and the insulating bobbin are increased. As a result, after covering the intermediate portion of the lead with an insulating tube and bonding the insulating tube to the insulating bobbin, the intermediate portion can be more reliably secured to the insulating bobbin with an increased bonding strength between the insulating tube and insulating bobbin.

In the first rotor, the first and second hook portions are axially spaced from each other by a sufficiently large distance so that the lead can be turned between the first and second hook portions to change its extending direction.

With the above configuration, the lead can be easily guided and hooked to the second hook formation.

The first rotor further includes an insulating tube that is put on the intermediate portion of the lead. The first groove of the first hook portion has a width that is less than an outside diameter of the insulating tube, but is greater than a diameter of the lead.

With the above configuration, the lead can be led through the first groove, whereas the insulating tube cannot. Consequently, it is possible to restrict movement of the insulating tube without influencing extension of the lead.

In the first rotor, the pole cores are of Lundell-type and each has a plurality of claw portions. The first and second hook portions are located in a V-shaped groove formed between an adjacent pair of the claw portions of one of the pole cores. The intermediate portion of the lead, which is hooked by the second hook portion, is positioned radially outward of a root of the V-shaped groove with a radial gap between itself and the root.

With the above configuration, after performing resin impregnation between the lead, the insulating tube, and the insulating bobbin, a portion of the lead, which axially extends between the second hook portion and a shoulder portion of the pole core, has no impregnation resin applied thereon. Consequently, the portion can absorb vibration transmitted from the pole core to the lead, thereby reducing tensile stress induced in the lead.

According to the present invention, there is also provided a second rotor for a rotating electrical machine. The second rotor includes: 1) a shaft; 2) a pair of pole cores press-fit on the shaft; 3) a terminal provided on the shaft; 4) an insulating bobbin mounted on the pole cores, the insulating bobbin having a cylindrical body and a pair of flanges that extend radially outward from opposite axial ends of the body, respectively; 5) a field coil having a winding portion and a lead, the winding portion being wound around the body of the insulating bobbin, the lead having a proximal portion, a distal portion, and an intermediate portion between the proximal and distal portions, the proximal portion extending from the winding portion of the field coil, the distal portion being connected to the terminal; and 6) an insulating tube covering the intermediate portion of the lead of the field coil. Further, in the second rotor, one of the flanges of the insulating bobbin is formed with a first hook portion and a second hook portion. The first hook portion directs the proximal portion of the lead both radially inward and axially outward. The first hook portion has a first groove through which the lead extends. The first groove has its open end on a radially inner periphery of the first hook portion and its closed end positioned radially outward of the open end. The first hook portion has an end of the proximal portion of the lead, which is away from the winding portion of the field coil, hooked in the first groove. The second hook portion is located with a predetermined axial gap between the first and second hook portions to direct the intermediate portion of the lead, which is covered by the insulating tube, axially outward. The second hook portion has a second groove through which the lead extends. The second groove has its open end on a radially inner periphery of the second hook portion and its closed end positioned radially outward of the open end. The second hook portion has part of the insulating tube hooked in the second groove.

The second rotor has the same advantages as the first rotor. In addition, in the second rotor, the lead and the insulating tube are separately restricted in position. More specifically, the proximal portion of the lead is directly hooked by the first hook portion, while the insulating tube is directly hooked by the second hook portion. Consequently, the force of inertia of the insulating tube can be prevented from acting on the lead wire. As a result, it is possible to reduce stress induced in the lead.

According to a further implementation of the invention, in the second rotor, the one of the flanges is further formed with first and second restricting portions that face each other with a gap formed therebetween. The first and second restricting portions together restrict movement of the proximal portion of the lead which extends through the gap between the first and second restricting portions to the first groove of the first hook portion.

Consequently, in assembly of the rotor, the field coil can be reliably wound around the body of the insulating bobbin without causing the proximal portion of the lead to be loosened. Moreover, the lead can be extended to the first groove of the first hook portion via a shortest path.

In the second rotor, the first restricting portion is positioned forward in a winding direction of the field coil from the second restricting portion.

With the above configuration, it is possible to turn the proximal portion of the lead from the winding direction to the axially outward direction.

In the second rotor, the lead is turned from the winding direction of the field coil to the axially outward direction making contact with the first restricting portion on the outside of the turn and with the second restricting portion on the inside of the turn.

With the above configuration, it is possible to smoothly change the extending direction of the lead while reliably restricting movement of the lead.

In the second rotor, the second restricting portion tapers both in a direction opposite to a winding direction of the field coil and in a radially inward direction of the insulating bobbin.

With the above shape of the second restricting portion, during the process of extending the lead to the first hook portion, the contact area between the lead and the second restricting portion is increased. Consequently, it is difficult for the lead to deviate from the shortest extending path.

In the second rotor, a clearance between the first and second restricting portions is greater than the diameter of the lead. The clearance is defined as the distance between first and second hypothetical lines on a plane perpendicular to the radial direction of the insulating bobbin. The first hypothetical line extends on the plane through both an edge of the second restricting portion, on which the lead is turned, and an edge of the first hook portion which faces the second restricting portion. The second hypothetical line extends on the plane through an edge of the first restricting portion, which faces the first hook portion, and parallel to the first hypothetical line.

Specifying the clearance as above, the proximal portion of the lead can be easily extended, without losing its straightness, to reach the first groove of the first hook portion.

In the second rotor, the first groove of the first hook portion has a width that is less than the outside diameter of the insulating tube, but is greater than the diameter of the lead.

With such a width of the first groove, it is possible to restrict axial movement of the insulating tube.

In the second rotor, the pole cores are of Lundell-type and each has a plurality of claw portions. The first and second hook portions are located in a V-shaped groove formed between an adjacent pair of the claw portions of one of the pole cores. The insulating tube, which is hooked in the second groove of the second hook portion with the intermediate portion of the lead inserted therein, is positioned radially outward of the root of the V-shaped groove with a radial gap between itself and the root.

With the above configuration, after performing resin impregnation between the lead, the insulating tube, and the insulating bobbin, a portion of the lead, which axially extends between the second hook portion and a shoulder portion of the pole core, has no impregnation resin applied thereon. Consequently, the portion can absorb vibration transmitted from the pole core to the lead, thereby reducing tensile stress induced in the lead.

In the second rotor, the second groove may have a width equal to the sum of the diameter of the lead and twice the thickness of the insulating tube.

With such a width of the second groove, the insulating tube, which has the intermediate portion inserted therein, can be reliably secured in the second groove.

Otherwise, the second groove may have a width that is less than or equal to the outside diameter of the insulating tube, but is greater than the sum of the diameter of the lead and twice the thickness of the insulating tube.

With such a width of the second groove, the insulating tube, which has the intermediate portion inserted therein, can be easily put into the inside of the second groove.

In the second rotor, the axial gap between the first and second hook portions is filled with a resin impregnation material.

Consequently, the insulating tube can be securely bonded to the first and second hook portions.

In the second rotor, the open end of each of the first and second grooves is positioned forward in a winding direction of the field coil from the closed end of the same.

With the above configuration, it is possible to place the lead inside the first and second grooves simply by turning the lead from the winding direction of the field coil to the axially outward and radially inward direction.

In the second rotor, each of the first and second grooves has a cross section tapering from its open end to the closed end.

With such a cross section, the lead and insulating tube can be smoothly put into the insides of the first and second grooves. Moreover, once the lead and insulating tube have been put into the insides of the first and second grooves, they can be reliably secured therein.

In the second rotor, the one of the flanges has a V-shaped wall portion that is fit in the V-shaped groove formed in the pole core. Both the first and second hook portions are formed to protrude from the inner surface of the wall portion.

With such a wall portion, it is possible to more reliably fill a suitable amount of resin impregnation material in the axial gap between the first and second hook portions, thereby securing bonding the insulative tube to the hook portions. Moreover, in operation of the alternator, the first and second hook portions can flow vibration of the pole core, thereby reducing stress induced in the lead due to the vibration.

In the second rotor, a portion of the insulating tube, which is held in the second groove of the second hook portion, is located on or radially outward of a hypothetical line; the hypothetical line extends through both a contact point between the insulating tube and a shoulder portion of the pole core and the axially-center and radially-inmost point on the portion of the insulating tube held in the second groove.

With the above configuration, it is possible to more reliably prevent the insulating tube from being bonded to the shoulder portion of the pole core during resin impregnation.

According to the present invention, there is also provided a third rotor for a rotating electrical machine. The third rotor includes: 1) a shaft; 2) a pair of pole cores press-fit on the shaft; 3) a terminal provided on the shaft; 4) an insulating bobbin mounted on the pole cores, the insulating bobbin having a cylindrical body and a pair of flanges that extend radially outward from opposite axial ends of the body, respectively; 5) a field coil having a winding portion and a lead, the winding portion being wound around the body of the insulating bobbin, the lead having a proximal portion, a distal portion, and an intermediate portion between the proximal and distal portions, the proximal portion extending from the winding portion of the field coil, the distal portion being connected to the terminal; and 6) an insulating tube covering the intermediate portion of the lead of the field coil. Further, in the third rotor, one of the flanges of the insulating bobbin is formed with a first hook portion and a second hook portion. The first hook portion directs the proximal portion of the lead both radially inward and axially outward. The first hook portion has a groove through which the lead extends. The groove has its open end on a radially inner periphery of the first hook portion and its closed end positioned radially outward of the open end. The first hook portion has an end of the proximal portion of the lead, which is away from the winding portion of the field coil, hooked in the groove. The second hook portion has formed therein a passage to direct the intermediate portion of the lead, which is covered by the insulating tube, axially outward through the passage. The second hook portion has part of the insulating tube hooked in the passage.

With the above configuration, the third rotor can achieve the same advantages as the second rotor.

According to a further implementation of the invention, in the third rotor, the passage of the second hook portion has a width that is less than or equal to an outside diameter of the insulating tube, but is greater than the sum of a diameter of the lead and twice a thickness of the insulating tube.

With such a width of the passage, the insulating tube, which has the intermediate portion inserted therein, can be reliably secured in the passage.

In the third rotor, both the groove of the first hook portion and the passage of the second hook portion are filled with a resin impregnation material.

Consequently, the insulating tube can be securely bonded to the first and second hook portions.

According to the present invention, there is further provided a method of manufacturing a rotor for a rotating electrical machine. The rotor includes: a shaft; a pair of pole cores press-fit on the shaft; an insulating bobbin mounted on the pole cores, the insulating bobbin having a cylindrical body and a pair of flanges that extend radially outward from opposite axial ends of the body, respectively; and a field coil having a winding start lead, a winding portion wound around the body of the insulating bobbin, and a winding end lead. The method includes: 1) a coil winding step in which: movement of the winding start lead of the field coil is restricted by a winding start-side restricting portion of the insulating bobbin, the winding portion of the field coil is wound around the body of the insulating bobbin, and movement of the winding end lead of the field coil is restricted by a winding end-side restricting portion of the insulating bobbin; 2) and an insulating tube assembly step in which: an insulating tube is put on each of the leads of the field coil, each of the leads is held, moved to a hook portion, and put into a groove formed in the hook portion.

With the above method, since movement of the winding start lead of the field coil is restricted by the winding start-side restricting member, the winding portion of the field coil can be reliably wound around the body of the insulating bobbin without causing the winding start lead to be loosened. Moreover, the insulating tubes can be easily put on the corresponding leads of the field coil.

In the insulating tube assembly step, the insulating tube may be held, moved to the hook portion, and put into the groove along with the lead inserted therein.

Further, the insulating tube assembly step, the insulating tube may be pushed into the groove while being deformed. Otherwise, the insulating tube may be first deformed, and then put into the groove keeping the deformed state of the insulating tube.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 1A is a partially cross-sectional view showing the overall structure of a rotor for an automotive alternator according to the first embodiment of the invention;

FIG. 1B is an enlarged partially cross-sectional view showing part of the rotor;

FIG. 3 is a process chart illustrating the hook mechanism before and after performing resin impregnation;

FIG. 8A is an enlarged perspective view illustrating a hook mechanism according to the third embodiment of the invention before inserting a lead therein;

FIG. 8B is an enlarged perspective view illustrating the hook mechanism according to the third embodiment after inserting the lead therein;

FIG. 9 is a process chart illustrating the hook mechanism according to the third embodiment before and after performing resin impregnation;

DESCRIPTION OF PREFERRED EMBODIMENTS

Figure 2A:
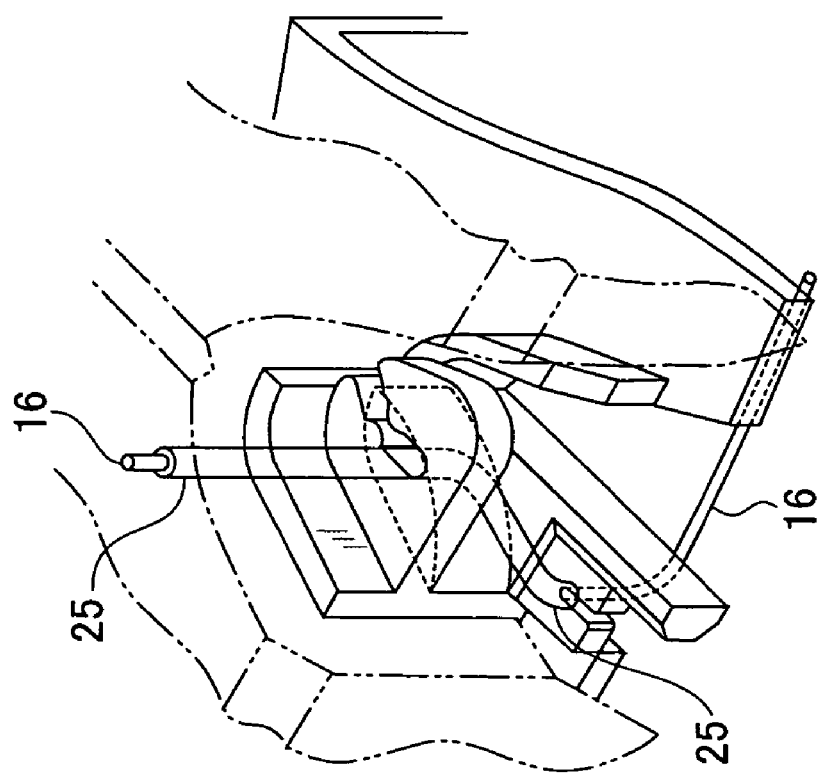
FIG. 2A is an enlarged perspective view illustrating a hook mechanism of the rotor before inserting a lead therein.

Preferred embodiments of the present invention will be described hereinafter with reference to FIGS. 1A-10.

It should be noted that, for the sake of clarity and understanding, identical components having identical functions in different embodiments of the invention have been marked, where possible, with the same reference numerals in each of the figures.

First Embodiment

FIG. 1A shows the overall structure of a rotor 1 according to the first embodiment of the invention.

The rotor 1 is designed to be used in an automotive alternator to create a rotating magnetic field. More specifically, the rotor 1 is designed to be rotatably supported by a frame (not shown) of the alternator and to be driven by an internal combustion engine of a motor vehicle.

As shown in FIG. 1A, the rotor 1 includes a shaft 2, a pair of Lundell-type pole cores 3 and 4 (i.e., rotor cores) press-fit on the shaft 2, an insulating bobbin 5 fit on the pole cores 3 and 4, a field coil 6 wound around the insulating bobbin 5, and cooling fans 7 and 8 fixed respectively to axial end faces of the pole cores 3 and 4.

The pole cores 3 and 4 have the same shape and size. Each of the pole cores has a cylindrical boss portion 9, a disc portion 10, and a plurality of claw portions 11. The boss portion 9 is coaxially press-fit on the shaft 2. The disc portion 10 extends radially outward from an axially outer part of the boss portion 9. Each of the claw portions 11 axially extends from a radially outer part of the disc portion 10 to form a claw-like magnetic pole. Further, between each adjacent pair of the claw portions 11, there is defined a V-shaped groove 12.

The magnetic pole cores 3 and 4 are so assembled together that the claw portions 11 of the magnetic pole core 3 are interleaved with those of the magnetic pole core 4, forming a hollow space therebetween; within the hollow space, the field coil 6 is received along with the insulating bobbin 5.

Referring now to FIG. 1B, the insulating bobbin 5 has a cylindrical body 13 and a pair of flanges 14. The body 13 is fit on the boss portions 9 of the pole cores 3 and 4, and has the field winding 6 wound thereon. The flanges 14 extend radially outward from opposite axial ends of the body 13, respectively. Moreover, one of the flanges 14, which is on the side of, for example, the pole core 3, has two protrusions 15 that are formed on the radially outer periphery of the flange 14 and spaced in the circumferential direction of the flange 14 at an interval of 180°. In other words, the protrusions 15 are symmetrically formed with respect to the shaft 2. Each of the protrusions 15 has formed therein a hook mechanism for hooking (or securing) a corresponding one of winding start and winding end leads 16 of the field coil 6. The hook mechanism is made up of a first hook portion 17 and a second hook portion 18.

Each of the winding start and winding end leads 16 of the field coil 6 has a proximal portion, an intermediate portion, and a distal portion. The proximal portion is hooked by the first hook portion 17. The intermediate portion is hooked by the second hook portion 18, and extends from the second hook portion 18 first axially outward and then radially inward along a groove 19 that is formed in the axial end face of the pole core 3. The distal portion is to be described below.

Referring back to FIG. 1A, on an end portion of the shaft 2 on the side of the pole core 3, there are provided a pair of slip rings 20 and 21. The slip rings 20 and 21 are respectively connected to a pair of terminals 22 and 23 provided on the shaft 2. Further, to the terminals 22 and 23, there are respectively connected the distal portions of the winding start and winding end leads 16 of the field coil 6. Consequently, the field coil 6 is connected to the slip rings 20 and 21 via the winding start and winding end leads 16 of the field coil 6.

The cooling fans 7 and 8 are respectively fixed, for example by welding, to the axial end faces of the pole cores 3 and 4. In operation of the alternator, the cooling fans 7 and 8 create, with rotation of the rotor 1, flows of cooling air for cooling components of the alternator, such as a stator. Moreover, the cooling fan 7 has two cut portions, through which the grooves 19 formed in the axial end face of the pole core 3 are exposed without interfering with the cooling fan 7.

After having described the overall structure of the rotor 1, the hook mechanisms for hooking the leads 16 of the field coil 6 will now be described with reference to FIGS. 2A, 2B, and 3.

In addition, in the present embodiment, the winding start and winding end leads 16 of the field coil 6 are symmetrically extended with respect to the shaft 2, and the hook mechanisms for hooking them are identical to each other. Therefore, for the sake of simplicity, only the winding end lead 16 and the hook mechanism therefore will be described in detail hereinbelow. Moreover, except for where specifically noted, all direction-related expressions, such as "axial direction", "radial direction", "circumferential direction", "axially", "radially", and "circumferentially" are used hereinafter with respect to the cylindrical body 13 of the insulating bobbin 5.

Figure 2B:
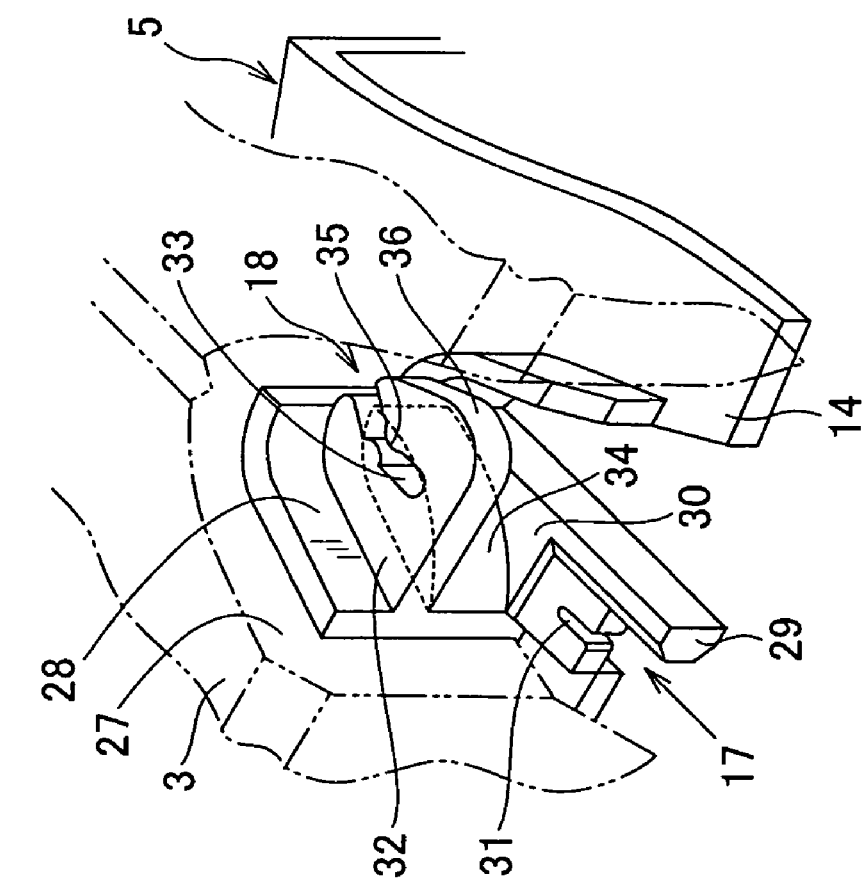
FIG. 2B is an enlarged perspective view illustrating the hook mechanism after inserting the lead therein.

As shown in FIGS. 2A, 2B, and 3, the flange 14 of the insulating bobbin 5 is formed with a V-shaped wall portion 28, a restricting portion 29, a fan-shaped portion 30, and a fan-shaped portion 32.

The wall portion 28 is fit to the surface 27 of the V-shaped groove 12 formed between the claw portions 11 of the pole core 3 and protrudes axially outward from the flange 14 by a predetermined distance.

The restriction portion 29 protrudes radially outward from the flange 14 by a predetermined distance, and has a rectangular cross section.

The fan-shaped portion 30 is integrally formed with the restricting portion 29 to protrude from the inner surface of the wall portion 28. The fan-shaped portion 30 has a slit-like groove 31 formed in the radially outer periphery thereof, thereby defining the first hook portion 17.

More specifically, the groove 31 has its open end on the radially outer periphery of the fan-shaped portion 30 and its closed end positioned radially inward of the open end. Further, the groove 31 has a width that is greater than the diameter of the lead 16 of the field coil 6, but is less than the outside diameter of an insulating tube 25 for covering the lead 16. Accordingly, the lead 16 can be led through the groove 31, whereas the insulating tube 25 cannot. Consequently, with such a width of the groove 31, it is possible to restrict axial movement of the insulating tube 25.

The fan-shaped portion 32 also protrudes from the inner surface of the wall portion 28. The fan-shaped portion 32 has a groove 33 formed in the radially inner periphery thereof, thereby defining the second hook portion 18.

More specifically, the groove 33 has its open end on the radially inner periphery of the fan-shaped portion 32 and its closed end positioned radially outward of the open end. Further, the groove 33 has a width at the open end which is greater than the outside diameter of the insulating tube 25. Furthermore, there is formed a neck in an intermediate potion between the open and closed ends of the groove 33. The neck has a width that is less than the outside diameter of the insulating tube 25, but is greater than or equal to the sum of the diameter of the lead 16 and twice the thickness of the insulating tube 25. Accordingly, when the insulating tube 25 has the lead 16 inserted therein, it cannot be put into the inside of the groove 33 through the neck 35 without deformation, but can be put into the inside through the neck 35 with deformation. Moreover, when the insulating tube 25 along with the lead 16 is placed inside of and hooked by the neck 35, the insulating tube 25 is positioned radially outward of the root of the V-shaped groove 12 of the pole core 3 with a radial gap therebetween. Consequently, in performing resin impregnation for bonding the insulating tube 25 to the flange 14, it is possible to reliably prevent the insulating tube 25 from being bonded to the surface 27 of the V-shaped groove 12.

The first and second hook portions 17 and 18 are axially spaced from each other by a sufficiently large distance, so that the insulating tube 25, with the lead 16 inserted therein, can be easily turned between the two hook portions 17 and 18 to change its extending direction.

Moreover, in the space between the first and second hook portions 17 and 18, there is formed a guiding portion. 34 for guiding the insulating tube 25 and the lead 16 to be smoothly turned. The guiding portion 34 protrudes from the inner surface of the wall portion 28, and has an arc shape or a convex shape so as to increase its surface area contacting the insulating tube 25.

Furthermore, for facilitating the process of hooking the insulating tube 25 and the lead 16 to the second hook portion 18, one side of the V-shaped wall portion 28 is cut out in the range from the axially outer end of the wall portion 28 to approximately the axial midpoint between the fan-shaped portions 30 and 32. Consequently, the fan-shaped portion 32 defining the second hook portion 18 is separated from the wall portion 28 on the cut-out side, thereby defining a free end 36 thereof. Further, the open end of the groove 33 is formed in the free end 36. Therefore, the insulating tube 25 and the lead 16 can be easily guided to the open end of the groove 33 and put into the groove 32. In addition, for further facilitating the process of hooking the insulating tube 25 and the lead 16 to the second hook portion 18, the corners of the free end 36 are rounded.

Next, a process of fixing the leads 16 of the field coil 6 according to the present embodiment will be described with reference to FIGS. 3 and 4.

In the present embodiment, the process of fixing the leads 16 of the field coil 6 consists of a coil winding process, an insulating tube assembly process, and a resin impregnation process.

Coil Winding Process

First, the winding start lead 16 of the field coil 6 is bent around the restricting portion 29 of one of the two hook mechanisms and led through the groove 31 of the first hook portion 17 (i.e., the fan-shaped portion 30) to extend in the axial direction of the insulating bobbin 5.

Then, the field coil 6 is wound, by means of a coil winding device (not shown), around the cylindrical body 13 of the insulating bobbin 5 to form a winding portion of the field coil 6.

Thereafter, the winding end lead 16 of the field coil 6 is bent around the restricting portion 29 of the other hook mechanism and led through the groove 31 of the first hook portion 17 to extend in the axial direction of the insulating bobbin 5.

In the present embodiment, movement of the winding start lead 16 is restricted by the restring portion 29 during the winding of the field coil 6 around the body 13 of the insulating bobbin 5. Consequently, the field coil 6 can be reliably wound without causing the proximal portion of the winding start lead 6 to be loosened.

Insulating Tube Assembly Process

Figure 4:
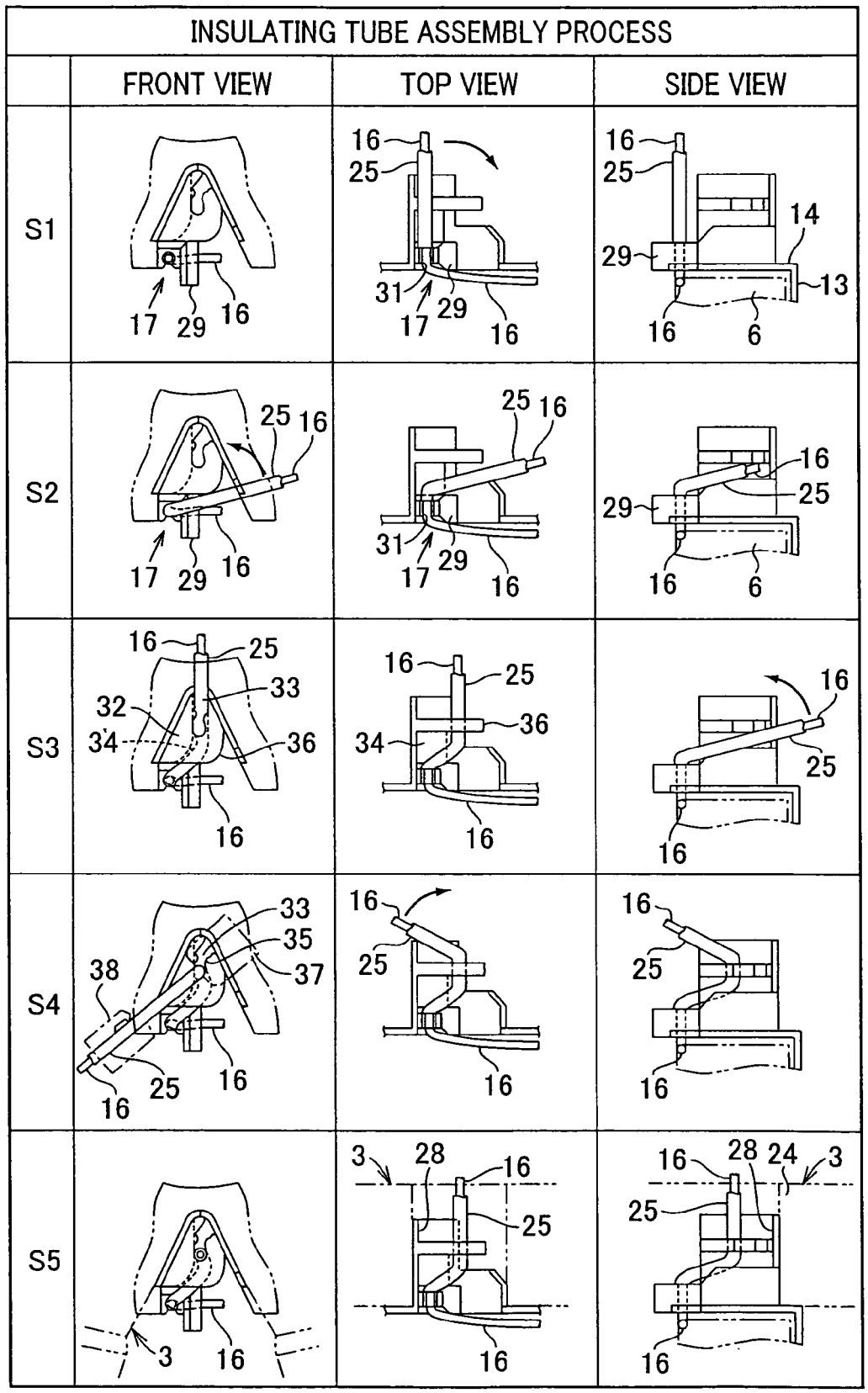
FIG. 4 is a process chart illustrating an insulating tube assembly process.

First, referring to FIG. 4, an insulating tube 25 is assembled to the winding end lead 16 of the field coil 6 by the following steps.

In the first step S1, the insulating tube 25 is put on the lead 16 in the axially inward direction to reach the entrance of the groove 31 of the first hook portion 17.

In the second step S2, the distal portions of the lead 16 and the insulating tube 25 are held and pivoted on the restricting portion 29 to move both against the winding direction of the field coil 6 and radially inward.

In the third step S3, the distal portions of the lead 16 and the insulating tube 25 are held and moved, causing the intermediate portions of the same to move, with the guidance of the guiding portion 34, along the free end 36 of the fan-shaped portion 32 to reach the open end of the groove 33.

In the fourth step S4, the distal portions of the lead 16 and the insulating tube 25 are held by a holder (e.g., a chuck) 38, and the intermediate portions of the same are pushed, by a pushing device 37, into the inside of the groove 33 through the neck 35, deforming the intermediate portion of the insulating tube 25.

In the fifth step S5, the distal portions of the lead 16 and the insulating tube 25 are held and turned, making the intermediate portions of the same extend in the axial direction of the insulating bobbin 25 with a radial gap between the insulating tube 25 and the wall portion 28.

Thereafter, the intermediate portion of the winding end lead 16 of the field coil 6 is bent around a shoulder portion 24 of the pole core 3 to extend radially inward along the groove 19 formed in the axial end face of the pole core 3. Then, the distal portion of the winding end lead 16 is joined, for example by welding, to the terminal 23.

After performing the above steps for the winding end lead 16, the same steps are also performed for the winding start lead 16, thereby assembling an insulating tube 25 to the winding start lead 16. As a result, the distal portion of the winding start lead 16 is joined, for example by welding, to the terminal 22.

In the present embodiment, for each of the winding start and winding end leads 16 of the field coil 6, the groove 33 of the second hook portion 18 has the neck 35. Consequently, with the lead 16 can be easily and reliably hooked by the second hook portion 18.

Resin Impregnation Process

An impregnation material 40, which is made up of a resin, is applied to each of the winding start and winding end leads 16 of the field coil 6.

More specifically, as shown in FIG. 3, a suitable amount of the impregnation material 40 is filled between the lead 16, the insulating tube 25, the first and second hook portions 17 and 18, the restricting portion 29, and the flange 14, thereby bonding them together. Consequently, the lead 16 can be reliably secured.

At the same time, a portion of the lead 16, which axially extends between the second hook portion 18 of the hook mechanism and the shoulder portion 24 of the pole core 3, has no impregnation material applied thereon. Consequently, the portion can absorb vibration transmitted from the pole core 3 to the lead 16, thereby reducing tensile stress induced in the lead 16.

According to the present embodiment, the following advantages can be achieved.

In the present embodiment, for each of the winding start and winding end leads 16 of the field coil 6, the proximal portion is bent around the restricting portion 29 and led through the groove 31 of the first hook portion 17 (i.e., the fan-shaped portion 30). Consequently, the proximal portion is hooked by the first hook portion 17. The intermediate portion is, after being covered by the insulating tube 25, extended from the first hook portion 17 to the second hook portion 18 (i.e., the fan-shaped portion 32) with the guidance of the guiding portion 34. Then, the intermediate portion is moved radially inward along the free end 36 of the second hook portion 17 to the open end of the groove 33. Thereafter, the intermediate portion is pushed into the inside of the groove 33 through the neck 35 of the groove 33, deforming the insulating tube 25 put thereon. Consequently, the intermediate portion is hooked by the second hook portion 18. Moreover, the intermediate portion is further extended axially outward from the second hook portion 18 to the shoulder portion 24 of the pole core 3, keeping the radial gap between itself and the root of the V-shaped groove 12 of the pole core 3. After being bent around the shoulder portion 24, the intermediate portion is extended radially inward along the groove 19 formed in the axial end face of the pole core 3. Furthermore, after hooking the lead 16, the impregnation material 40 is applied between the lead 16, the insulating tube 25, and the insulating bobbin 5, thereby securing the lead 16 along with the insulating tube 25.

With the above configuration, each of the winding start and winding end leads 16 of the field coil 6 can be easily and reliably hooked by the corresponding hook mechanism. Consequently, it is possible to reliably prevent each of the leads 16 from being loosened. Further, in operation of the alternator, it is also possible to prevent each of the leads 16 from being broken due to a centrifugal force and a repeated tensile force received from the pole core 3.

Moreover, with the above configuration, the insulating tubes 25, which are hooked and bonded along with the corresponding leads 16 of the field coil 6, can be kept at fixed positions, facilitating the assembly of the rotor 1 to the alternator. In addition, since the insulating tubes 25 are connected to the corresponding leads 16 via the impregnation material 40, they can serve as reinforcing members to disperse stresses induced in the corresponding leads 16.

Second Embodiment

This embodiment illustrates hook mechanisms for hooking the leads 16 of the field coil 6 which are different from the hook mechanisms according to the first embodiment.

In addition, in the present embodiment, the hook mechanisms for hooking the winding start and winding end leads 16 of the field coil 6 are also identical to each other. Therefore, for the sake of simplicity, only the winding end lead 16 and the hook mechanism therefore will be described hereinafter.

Figure 5A:
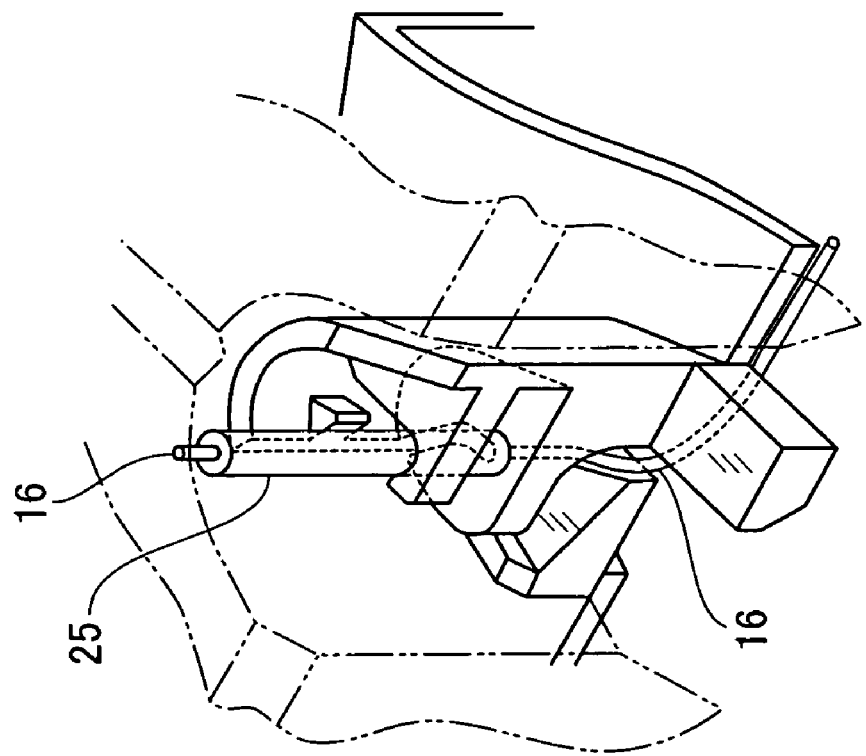
FIG. 5A is an enlarged perspective view illustrating a hook mechanism according to the second embodiment of the invention before inserting a lead therein.
Figure 5B:
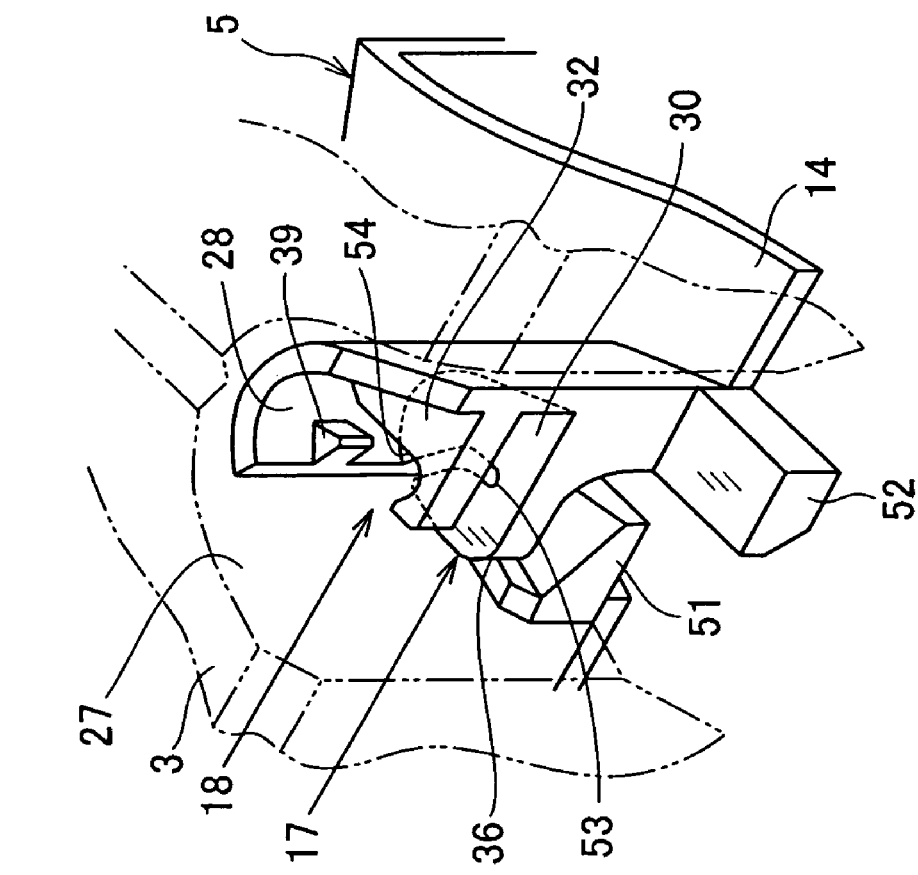
FIG. 5B is an enlarged perspective view illustrating the hook mechanism according to the second embodiment after inserting the lead therein.
Figure 6:
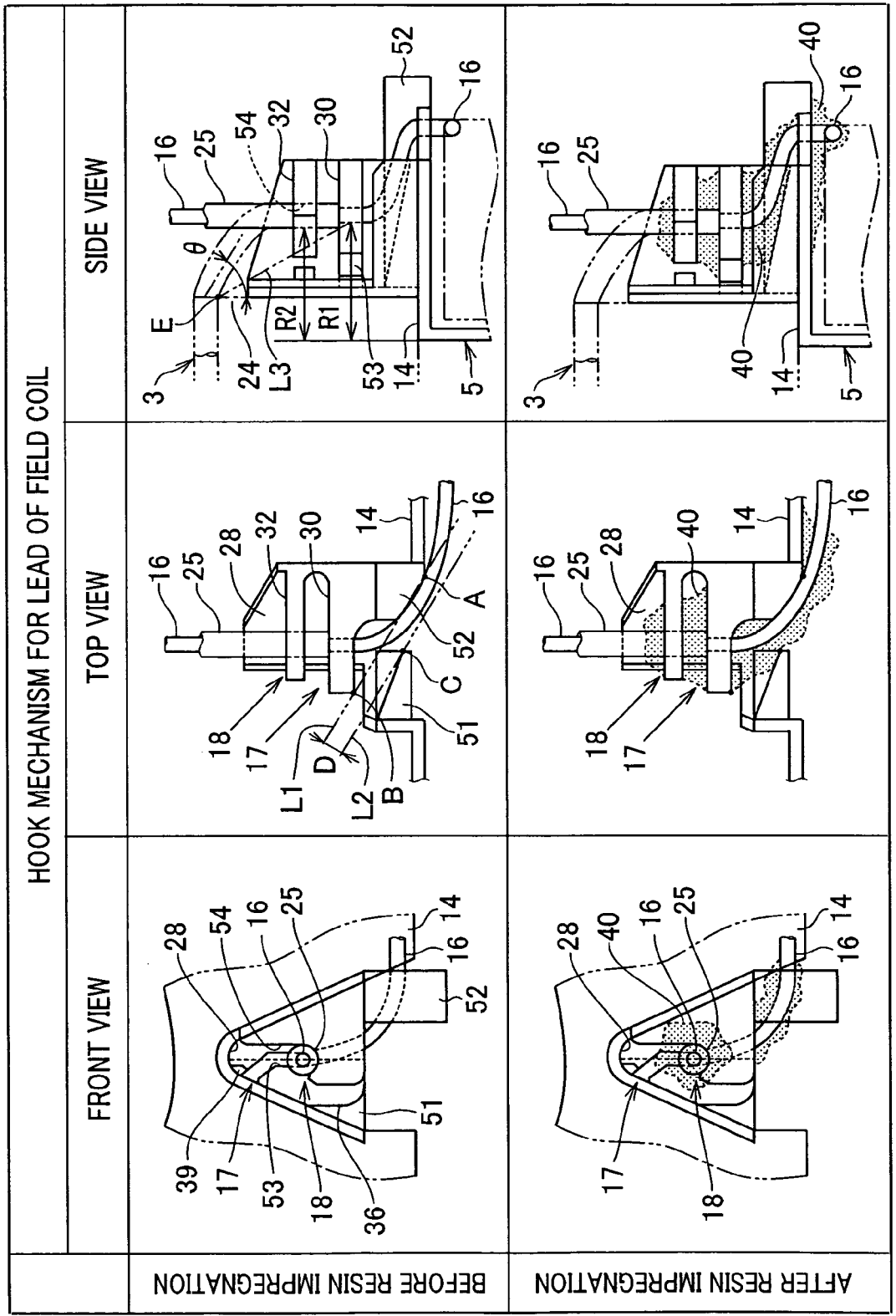
FIG. 6 is a process chart illustrating the hook mechanism according to the second embodiment before and after performing resin impregnation.

As shown in FIGS. 5A, 5B, and 6, in the present embodiment, the flange 14 of the insulating bobbin 5 is formed with a V-shaped wall portion 28, a first restricting portion 51, a second restricting portion 52, and fan-shaped portions 30, 32, and 39.

The wall portion 28 is fit to the surface 27 of the V-shaped groove 12 formed between the claw portions 11 of the pole core 3 and protrudes axially outward from the flange 14 by a predetermined distance.

The first restricting portion 51 protrudes from the inner surface of the wall portion 28 by a predetermined distance. The first restricting portion 51 tapers in the radially outward direction; therefore, the axial thickness of the first restricting portion 51 decreases in the radially outward direction. The first restricting portion 51 also tapers in the opposite direction to the winding direction of the field coil 6; therefore, the axial thickness of the first restricting portion 51 also decreases in the opposite direction.

The second restricting portion 52 protrudes from the inner surface of the V-shaped wall portion 28 to face the first restricting portion 51 in the circumferential direction. The second restricting portion 52 also protrudes from a top end of the wall portion 28 radially outward by a predetermined distance. In addition, the second restricting portion 52 has a substantially rectangular cross section.

The second restricting portion 52 is positioned closer to the proximal end of the lead 16 (i.e., the end of the proximal portion of the lead 16 connected to the winding portion of the field coil 6) than the first restricting portion 51. In other words, the first restricting portion 51 is positioned forward in the winding direction of the field coil 6 from the second restricting portion 52.

The fan-shaped portion 30 is integrally formed with the second restricting portion 52 to protrude from the inner surface of the wall portion 28. The fan-shaped portion 30 has a slit-like groove 53 formed in the radially inner periphery thereof, thereby defining a first hook portion 17.

More specifically, the groove 53 has its open end on the radially inner periphery of the fan-shaped portion 30 and its closed end positioned both radially outward and backward in the winding direction of the field coil 6 from the open end. Further, the groove 53 has a cross section tapering from the open end to the closed end. Consequently, the proximal portion of the lead 16 can be smoothly put into the inside of the groove 53 from the open end. Moreover, once the proximal portion of the lead 16 has been put into the inside of the groove 53, it can be more reliably secured therein. Furthermore, the width of the groove 53 at the closed end is greater than the diameter of the lead 16 of the field coil 6, but is less than the outside diameter of an insulating tube 25 for covering the lead 16. Accordingly, the lead 16 can be led through the groove 53 on the side of the closed end, whereas the insulating tube 25 cannot. Consequently, it is possible to restrict axial movement of the insulating tube 25.

Moreover, referring to FIG. 6, when the proximal portion of the lead 16 is bent around an edge A of the second restricting portion 52 and hooked by the first hook portion 17, a clearance D between the first and second restricting portions 51 and 52 is specified to be greater than the diameter of the lead 16. Here, the clearance D is defined as the distance between two hypothetical lines L1 and line L2 on a plane perpendicular to the radial direction; the hypothetical line L1 extends on the plane through both the edge A of the second restricting portion 52 and an edge B of the fan-shaped portion 30, the edge B facing the first restricting portion 51; the hypothetical line L2 extends on the plane through an edge C of the first restricting portion 51 and parallel to the hypothetical line L1, the edge C facing the fan-shaped portion 30.

Specifying the clearance D as above, the proximal portion of the lead 16 can be easily extended, without losing its straightness, to reach the groove 53 of the first hook portion 17 (i.e., the fan-shaped portion 30).

The fan-shaped portion 32 protrudes from the inner surface of the wall portion 28 to extend parallel to the fan-shaped portion 30 with a predetermined axial gap between the fan-shaped portions 30 and 32. The fan-shaped portion 32 has a groove 54 formed in the radially inner periphery thereof, thereby defining a second hook portion 18.

More specifically, the groove 54 has its open end on the radially inner periphery of the fan-shaped portion 32 and its closed end positioned both radially outward and backward in the winding direction of the field coil 6 from the open end. The groove 54 has an arch-shaped cross section perpendicular to the axial direction. Alternatively, the groove 54 may also have the same shape as the groove 53 of the first hook portion 17. The groove 54 has a cross section tapering from the open end to the closed end. Consequently, the intermediate portion of the lead 16 can be smoothly put into the inside of the groove 54 from the open end. Furthermore, where the insulating tube 25 along with the intermediate portion of the lead 16 is placed inside of the groove 54 in contact with the closed end of the groove 54, the width of the groove 54 is greater than or equal to the sum of the diameter of the lead 16 and twice the thickness of the insulating tube 25, but is less than or equal to the outside diameter of the insulating tube 25. Consequently, the insulating tube 25 and the intermediate portion of the lead 16 can be securely hooked in the groove 54.

The fan-shaped portion 39 protrudes from the inner surface of the wall portion 28 and is positioned both on the opposite side of the V-shaped wall portion 28 to the fan-shaped portion 32 and on the axially outer side of the fan-shaped portion 32. The fan-shaped portion 39 is provided to guide the intermediate portion of the lead 16 to be smoothly put into the inside of the groove 54 of the fan-shaped portion 32.

In the present embodiment, the grooves 53 and 54 are so formed that the lead 16 extending through them are positioned radially outward of the wall portion 28 with a radial gap between the lead 16 and the wall portion 28. Further, the first and second hook portions 17 and 18 (i.e., the fan-shaped portions 30 and 32) are axially away from each other with the predetermined axial gap therebetween. Consequently, the lead 16 can be easily turned between the first and second hook portions 17 and 18 and the wall portion 28, and thus can be easily put into the insides of the grooves 53 and 54. Moreover, in performing resin impregnation, a suitable amount of impregnation material can be filed in the axial gap between the first and second hook portions 17 and 18, thereby securely bonding the insulating tube 25 to the hook portions 17 and 18.

Moreover, referring to FIG. 6, after hooking the lead 16 and the insulating tube 25 to the first and second hook portions 17 and 18, that portion of the insulating tube 25 which is held in the groove 54 is radially away from the radially inner surface of the insulating bobbin 5 by a predetermined distance R2. Further, that portion of the lead 16 which is held in the groove 53 is radially away from the radially inner surface of the insulating bobbin 5 by a predetermined distance R1. Furthermore, the distances R1 and R2 are so predetermined that the portion of the insulating tube 25 held in the groove 54 is located radially outward of a hypothetical line L3; the hypothetical line L3 extends through both the contact point E between the insulating tube 25 and the shoulder portion 24 of the pole core 3 and the axially-center and radially-inmost point on the portion of the lead 16 held in the groove 53. Consequently, the angle θ between the axial direction and the extending direction of the portion of the insulating tube 25 between the shoulder portion 24 of the pole core 3 and the groove 54 can be made large. As a result, it is possible to more reliably prevent the insulating tube 25 from being bonded to the shoulder portion 24 of the pole core during resin impregnation.

For facilitating the process of hooking the lead 16 to the first hook portion 17, one side of the V-shaped wall portion 28, on which no hook portion is formed, is cut out in the range from the axially outer end of the wall portion 28 to approximately the axial midpoint between the fan-shaped portion 30 and the first restricting portion 51. Consequently, the fan-shaped portion 30 defining the first hook portion 17 is separated from the wall portion 28 on the cut-out side, thereby defining a free end 36 thereof. Further, the open end of the groove 53 is formed in the free end 36. Therefore, the lead 16 can be easily guided to the open end of the groove 53 and put into the groove 53. In addition, for further facilitating the process of hooking the lead 16 to the first hook portion 17, the corners of the free end 36 are rounded.

Next, a process of fixing the leads 16 of the field coil 6 according to the present embodiment will be described with reference to FIGS. 6 and 7.

In the present embodiment, the process of fixing the leads 16 of the field coil 6 consists of a coil winding process, an insulating tube assembly process, and a resin impregnation process.

Coil Winding Process

First, the winding start lead 16 of the field coil 6 is bent around the edge A of the second restricting portion 52 of one of the two hook mechanisms to extend through the gap between the first and second restricting portions 51 and 52.

Then, the field coil 6 is wound, by means of a coil winding device (not shown), around the cylindrical body 13 of the insulating bobbin 5 to form the winding portion of the field coil 6.

Thereafter, the winding end lead 16 of the field coil 6 is bent around the edge A of the second restricting portion 52 of the other hook mechanism to extend through the gap between the first and second restricting portions 21 and 52.

In the present embodiment, movement of the winding start lead 16 is restricted by the restricting portions 51 and 52 during the winding of the field coil 6 around the body 13 of the insulating bobbin 5. Consequently, the field coil 6 can be reliably wound without causing the proximal portion of the winding start lead 6 to be loosened.

Insulating Tube Assembly Process

Figure 7:
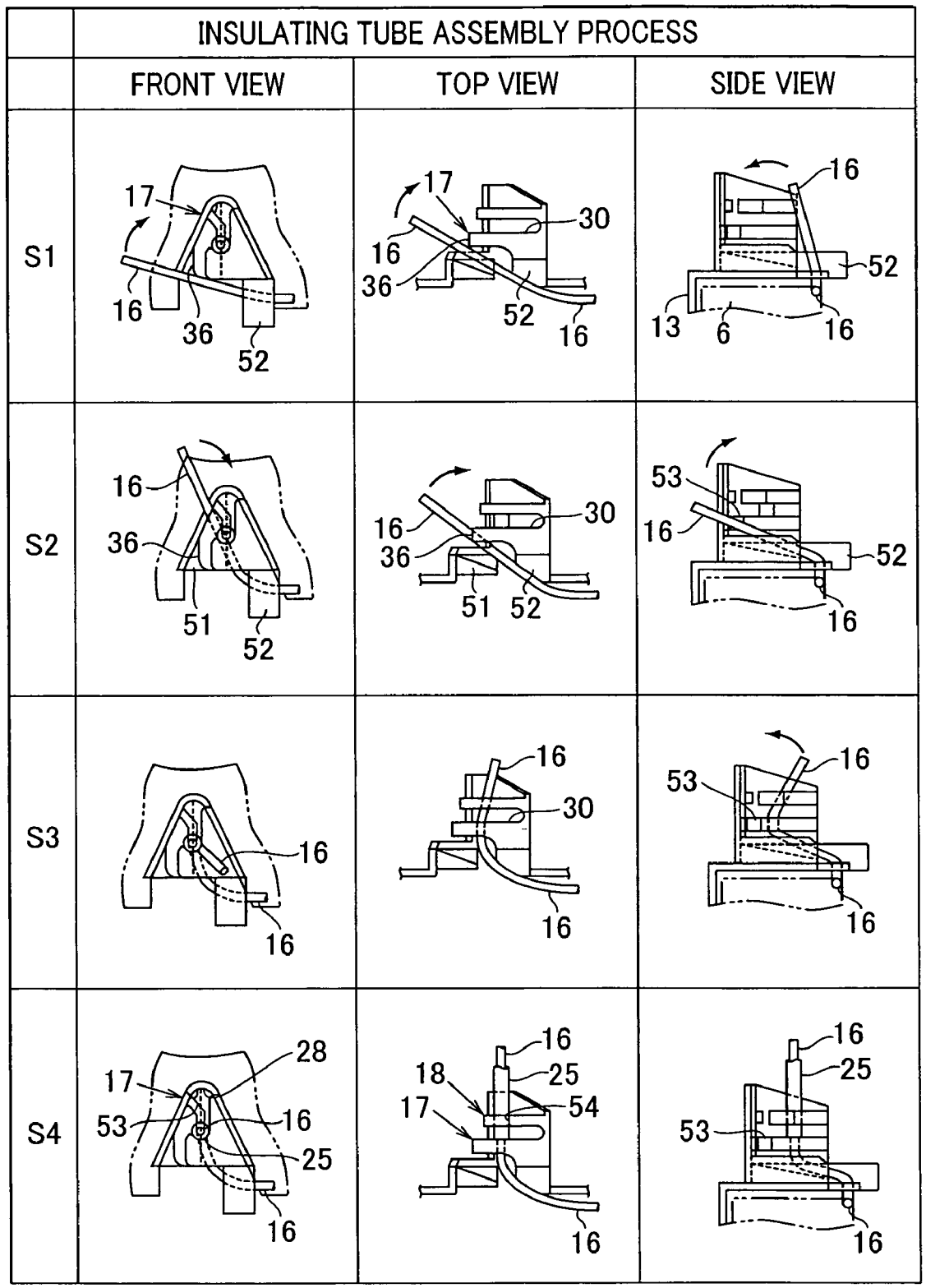
FIG. 7 is a process chart illustrating an insulating tube assembly process according to the second embodiment.

First, referring to FIG. 7, an insulating tube 25 is assembled to the winding end lead 16 of the field coil 6 by the following steps.

In the first step S1, the distal portion of the lead 16 is held and moved, causing the proximal portion of the lead 16 to move, without losing its straightness, radially inward to reach the free end 36 of the fan-shaped portion 30.

In the second step S2, the distal portion of the lead 16 is held and moved, causing the proximal portion of the lead 16 to move, without losing its straightness, along the free end 36 of the fan-shaped portion 30 both radially inward and axially outward to reach the open end of the groove 53.

In addition, since the clearance D is greater than the diameter of the lead 16 as described above, in this step, the proximal portion of the lead 16 can be easily led, without losing its straightness, along the free end 36 of the fan-shaped portion 30 to the open end of the groove 53.

In the third step S3, the distal portion of the lead 16 is held and moved, causing the proximal portion of the lead 16 to be put, without losing its straightness, into the groove 53 to reach the closed end of the groove 53.

In the fourth step S4, the insulating tube 25 is put on the lead 16 in the axially inward direction along with the internal surface of the groove 54 to reach the entrance of the groove 53 of the first hook portion 17.

As a result, the insulating tube 25 is placed on the intermediate portion of the lead 16, and is reliably secured between the first and second hook portions 17 and 18 and the wall portion 28 along with the lead 16.

Thereafter, referring to FIG. 6, the intermediate portion of the winding end lead 16 of the field coil 6 is bent around the shoulder portion 24 of the pole core 3 to extend radially inward along the groove 19 formed in the axial end face of the pole core 3. Then, the distal portion of the winding end lead 16 is joined, for example by welding, to the terminal 23.

After performing the above steps for the winding end lead 16, the same steps are also performed for the winding start lead 16, thereby assembling an insulating tube 25 to the winding start lead 16. As a result, the distal portion of the winding start lead 16 is joined, for example by welding, to the terminal 22.

Resin Impregnation Process

An impregnation material 40, which is made up of a resin, is applied to each of the winding start and winding end leads 16 of the field coil 6.

More specifically, as shown in FIG. 6, a suitable amount of the impregnation material 40 is filled between the lead 16, the insulating tube 25, the first and second hook portions 17 and 18, the first and second restricting portions 51 and 52, and the flange 14, thereby bonding them together. Consequently, the lead 16 can be reliably secured.

At the same time, a portion of the lead 16, which axially extends between the second hook portion 18 and the shoulder portion 24 of the pole core 3, has no impregnation material applied thereon. Consequently, the portion can absorb vibration transmitted from the pole core 3 to the lead 16, thereby reducing tensile stress induced in the lead 16.

According to the present embodiment, the same advantages as according to the first embodiment can be achieved.

In addition, according to the present embodiment, the proximal portion of each of the leads 16 of the field coil 6 can be led to and put into the groove 53 of the first hook portion 17 without losing its straightness and along a fixed course with respect to the radial and axial directions. As a result, the assembly of the leads 16 and insulating tubes 25 to the insulating bobbin 5 can be made easily and accurately.

Third Embodiment

This embodiment illustrates hook mechanisms for hooking the leads 16 of the field coil 6 which are modified from the hook mechanisms according to the second embodiment.

In addition, in the present embodiment, the hook mechanisms for hooking the winding start and winding end leads 16 of the field coil 6 are also identical to each other. Therefore, for the sake of simplicity, only the winding end lead 16 and the hook mechanism therefore will be described hereinafter.

As shown in FIGS. 8A, 8B, and 9, in the present embodiment, the flange 14 of the insulating bobbin 5 is formed with a V-shaped wall portion 28, a first restricting portion 51, a second restricting portion 52, fan-shaped portions 30 and 39, and protrusions 61 and 62.

The wall portion 28 is fit to the surface 27 of the V-shaped groove 12 formed between the claw portions 11 of the pole core 3 and protrudes axially outward from the flange 14 by a predetermined distance.

The first restricting portion 51 protrudes from the inner surface of the wall portion 28 by a predetermined distance. The first restricting portion 51 tapers in the radially outward direction; therefore, the axial thickness of the first restricting portion 51 decreases in the radially outward direction. The first restricting portion 51 also tapers in the opposite direction to the winding direction of the field coil 6; therefore, the axial thickness of the first restricting portion 51 also decreases in the opposite direction.

The second restricting portion 52 protrudes from the inner surface of the V-shaped wall portion 28 to face the first restricting portion 51 in the circumferential direction. The second restricting portion 52 also protrudes from a top end of the wall portion 28 radially outward by a predetermined distance. In addition, the second restricting portion 52 has a substantially rectangular cross section.

The second restricting portion 52 is positioned closer to the proximal end of the lead 16 (i.e., the end of the proximal portion of the lead 16 connected to the winding portion of the field coil 6) than the first restricting portion 51. In other words, the first restricting portion 51 is positioned forward in the winding direction of the field coil 6 from the second restricting portion 52.

The fan-shaped portion 30 is integrally formed with the second restricting portion 52 to protrude from the inner surface of the wall portion 28. The fan-shaped portion 30 has a slit-like groove 53 formed in the radially inner periphery thereof, thereby defining a first hook portion 17.

More specifically, the groove 53 has its open end on the radially inner periphery of the fan-shaped portion 30 and its closed end positioned both radially outward and backward in the winding direction of the field coil 6 from the open end. Further, the groove 53 has a cross section tapering from the open end to the closed end. Furthermore, the width of the groove 53 at the closed end is greater than the diameter of the lead 16 of the field coil 6, but is less than the outside diameter of an insulating tube 25 for covering the lead 16. Accordingly, the lead 16 can be led through the groove 53 on the side of the closed end, whereas the insulating tube 25 cannot. Consequently, it is possible to restrict axial movement of the insulating tube 25.

In the present embodiment, the relative position between the first and second restricting portions 51 and 52 and the first hook portion 17 is the same as that in the second embodiment; therefore, a repeated description thereof is omitted hereinafter.

The protrusion 61 is integrally formed with the fan-like portion 30 to protrude axially outward from an axially-outer end face of the fan-like portion 30. The protrusion 61 is positioned forward in the winding direction of the field coil 6 from the groove 53, and extends almost parallel to the groove 53. The protrusion 61 has the shape of a prism with a predetermined length and a trapezoidal cross section tapering axially outward.

The protrusion 62 protrudes from the inner surface of the wall portion 28 to extend parallel to the fan-shaped portion 30 with a predetermined axial gap therebetween. Moreover, the protrusion 62 has a predetermined axial thickness and an arc-shaped cross section perpendicular to the axial direction. The protrusion 62 also has an almost the same length as the protrusion 61, and has a curved side face that faces a side face of the protrusion 61. The protrusions 61 and 62 together define a second hook portion 18 which has a passage 64 formed between the side faces of the protrusions 61 and 62. The second hook portion 18 is provided to hook the intermediate portion of the lead 16 with the insulating tube 25 put thereon in the passage 64.

More specifically, the passage 64 has, where the intermediate portion of the lead 16 along with the insulating tube 25 are hooked, a width that is greater than or equal to the sum of the diameter of the lead 16 and twice the thickness of the insulating tube 25, but is less than or equal to the outside diameter of the insulating tube 25. Consequently, the insulating tube 25 and the intermediate portion of the lead 16 can be securely hooked in the passage 64.

The fan-shaped portion 39 protrudes from the inner surface of the wall portion 28 and is positioned both on the opposite side of the V-shaped wall portion 28 to the protrusion 62 and on the axially outer side of the protrusion 62. The fan-shaped portion 39 is provided to guide the intermediate portion of the lead 16 to be smoothly put into the inside of the passage 64 of the second hook portion 18.

Moreover, for facilitating the process of hooking the lead 16 to the first hook portion 17, one side of the V-shaped wall portion 28, on which no hook portion is formed, is cut out in the range from the axially outer end of the wall portion 28 to approximately the axial midpoint between the fan-shaped portion 30 and the first restricting portion 51. Consequently, the fan-shaped portion 30 defining the first hook portion 17 is separated from the wall portion 28 on the cut-out side, thereby defining a free end 36 thereof. Further, the open end of the groove 53 is formed in the free end 36. Therefore, the lead 16 can be easily guided to the open end of the groove 53 and put into the groove 53. In addition, for further facilitating the process of hooking the lead 16 to the first hook portion 17, the corners of the free end 36 are rounded.

Next, a process of fixing the leads 16 of the field coil 6 according to the present embodiment will be described with reference to FIGS. 9 and 10.

In the present embodiment, the process of fixing the leads 16 of the field coil 6 consists of a coil winding process, an insulating tube assembly process, and a resin impregnation process. In addition, the coil winding process is the same as in the second embodiment; therefore, a repeated description thereof is omitted hereinafter.

Insulating Tube Assembly Process

Figure 10:
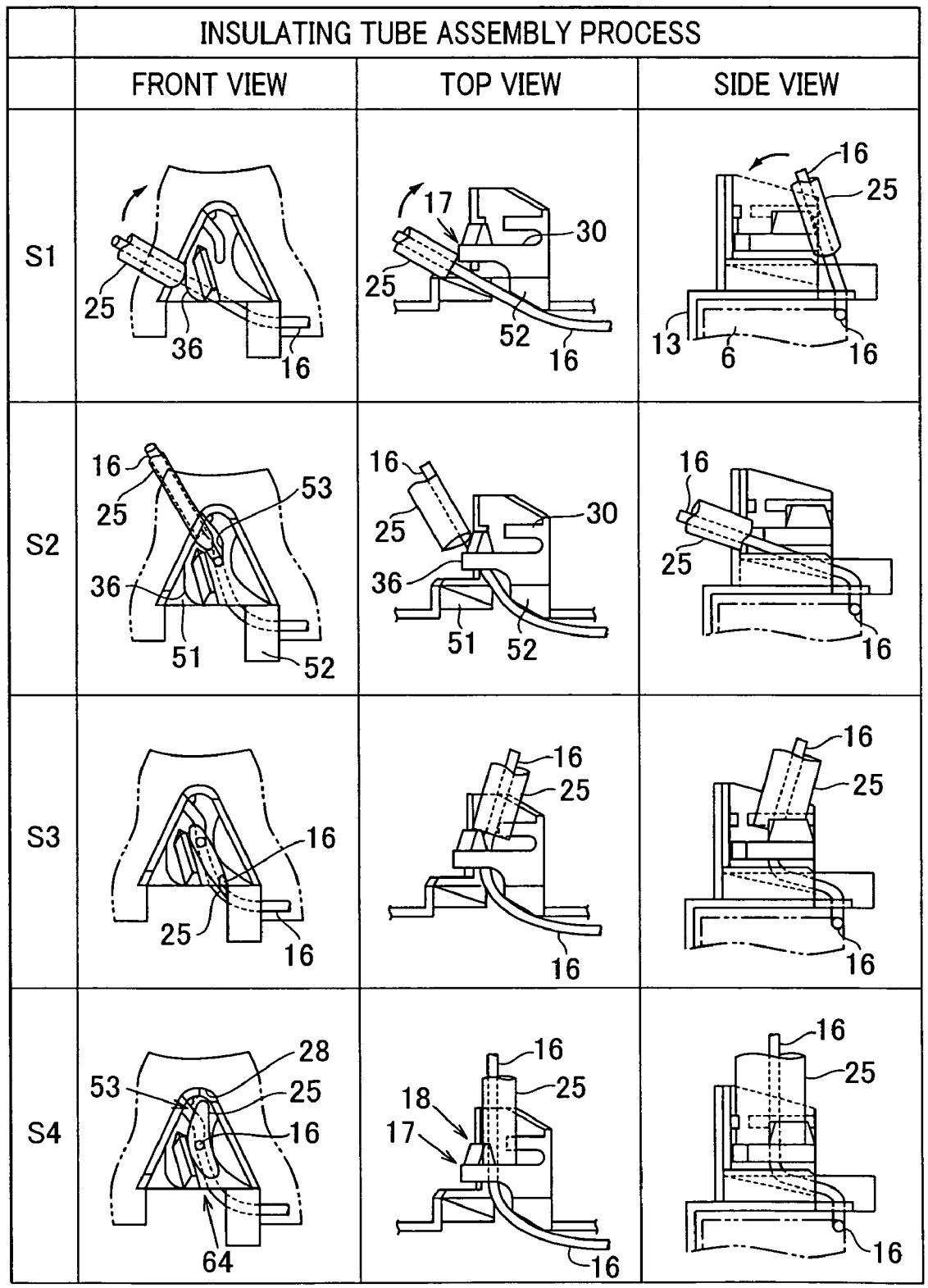
FIG. 10 is a process chart illustrating an insulating tube assembly process according to the third embodiment.
Figure 11B:
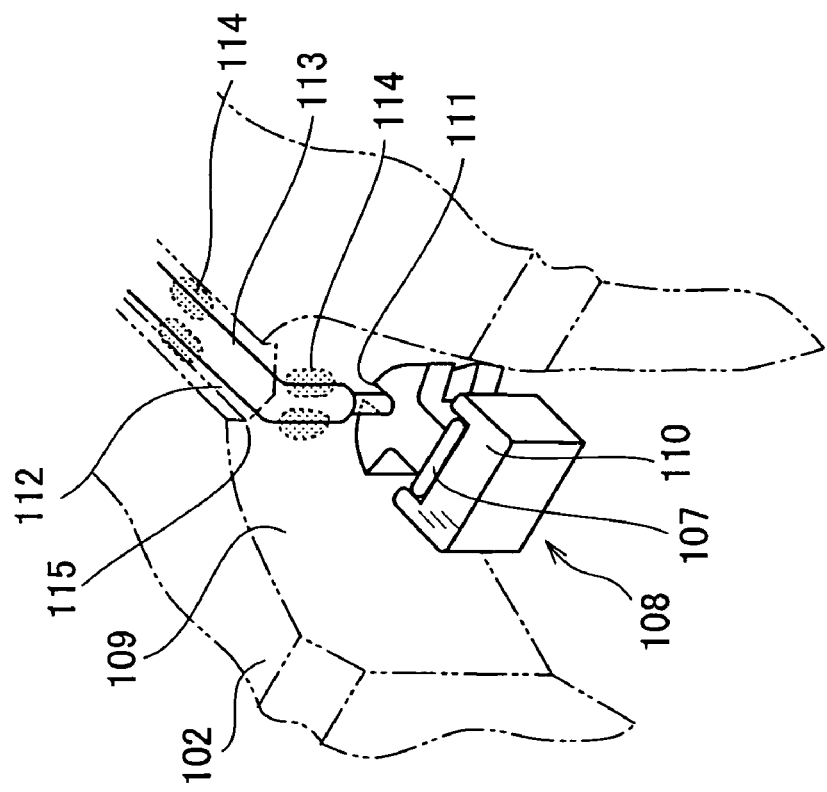
FIG. 11B is a perspective view of the part of the first prior art rotor viewed along the direction X of FIG. 11A.
Figure 11A:
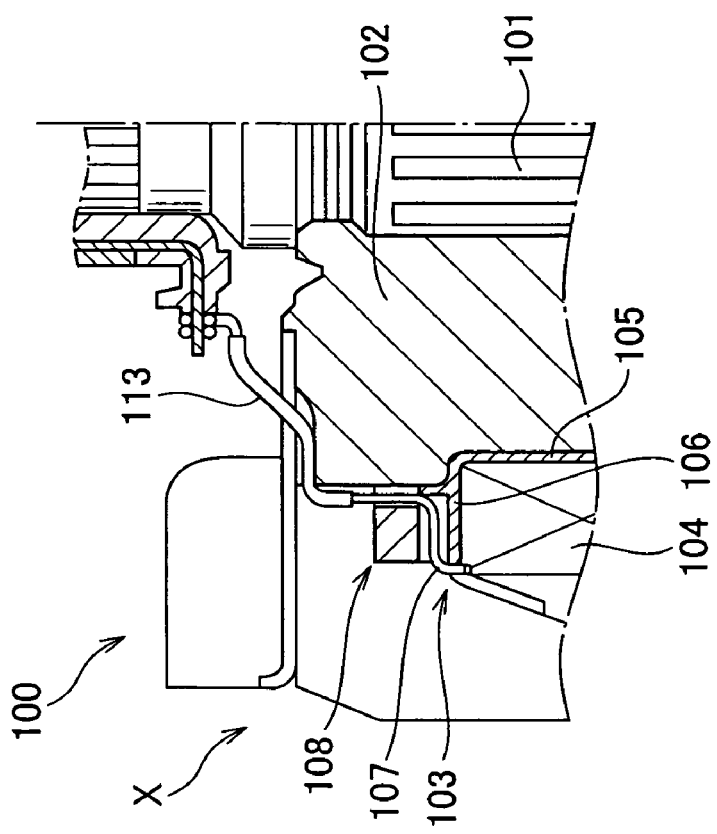
FIG. 11A is a partially cross-sectional view showing part of a first prior art rotor.
Figure 12A:
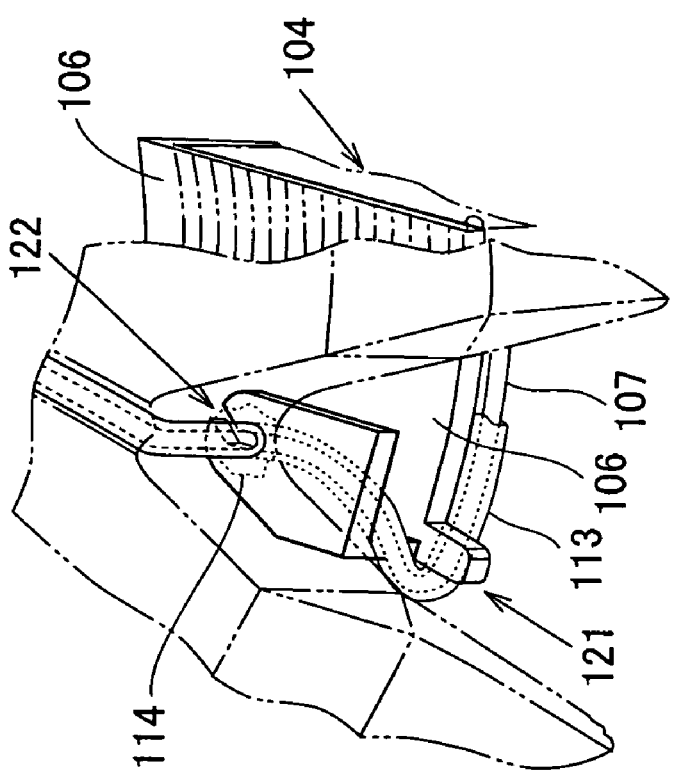
FIG. 12A is a perspective view of part of a second prior art rotor.
Figure 12B:
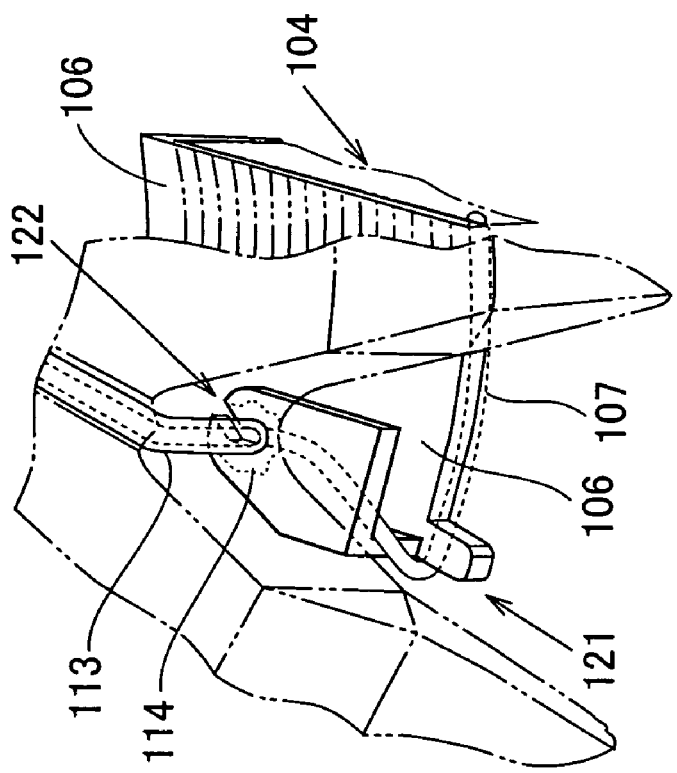
FIG. 12B is a perspective view of part of a variation of the second prior art rotor.
Figure 13C:
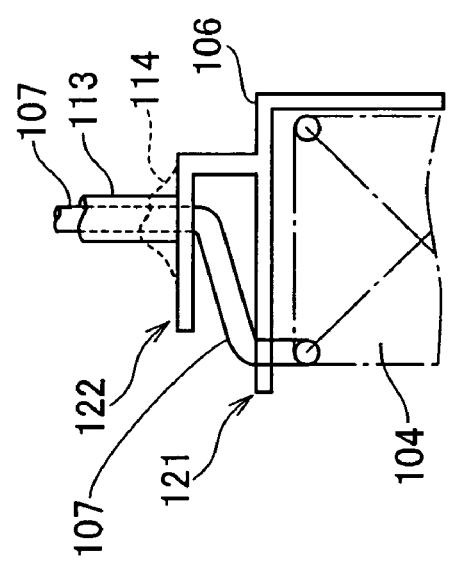
FIGS. 13A, 13B, and 13C are respectively front, top, and side views showing hook portions formed in the second prior art rotor.
Figure 13B:
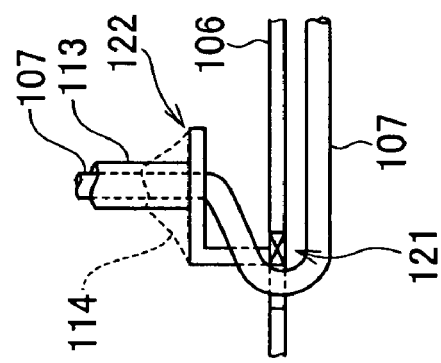
Figure 13A:
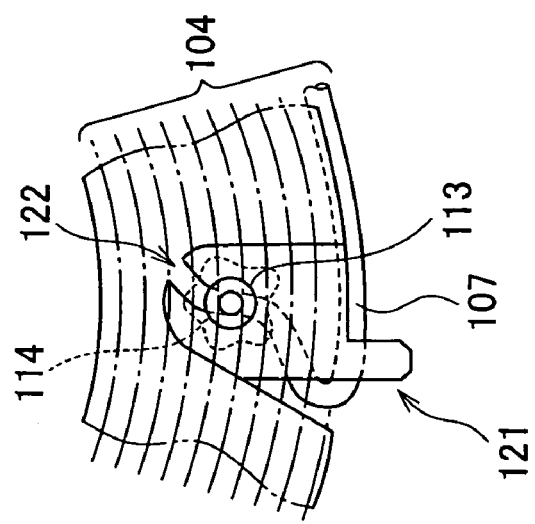

First, referring to FIG. 10, an insulating tube 25 is assembled to the winding end lead 16 of the field coil 6 by the following steps.

In the first step S1, the distal portion of the lead 16 is held and moved, causing the proximal portion of the lead 16 to move, without losing its straightness, radially inward to reach the free end 36 of the fan-shaped portion 30. Then, the insulating tube 25 is put on the intermediate portion of the lead 16.

In the second step S2, the intermediate portion of the lead 16 and the insulating tube 25 are held and moved, causing the proximal portion of the lead 16 to move, without losing its straightness, along the free end 36 of the fan-shaped portion 30 both radially inward and axially outward to reach the open end of the groove 53.

In addition, since the clearance D as defined in the second embodiment is greater than the diameter of the lead 16, in this step, the proximal portion of the lead 16 can be easily led, without losing its straightness, along the free end 36 of the fan-shaped portion 30 to the open end of the groove 53.

In the third step S3, the intermediate portion of the lead 16 and the insulating tube 25 are held and moved, causing the proximal portion of the lead 16 to be put, without losing its straightness, into the groove 53 of the first hook portion 17. At the same time, the intermediate portion of the lead 16 and the insulating tube 25 are put into the passage 64 of the second hook portion 18 with deformation of the insulating tube 25.

In addition, it is also possible to push the intermediate portion of the lead 16 and the insulating tube 25 into the passage 64 using a pushing device and a holder as described in the first embodiment. Further, it is also possible to: first deform the insulating tube 25; and then put the insulating tube 25 with the intermediate portion of the lead 16 inserted therein into the passage 64 keeping the deformed state of the insulating tube 25.

In the fourth step S4, the intermediate portion 16 and the insulating tube 25 are turned to extend axially outward from the second hook portion 18.

Thereafter, the intermediate portion of the winding end lead 16 of the field coil 6 is bent around the shoulder portion 24 of the pole core 3 to extend radially inward along the groove 19 formed in the axial end face of the pole core 3. Then, the distal portion of the winding end lead 16 is joined, for example by welding, to the terminal 23.

After performing the above steps for the winding end lead 16, the same steps are also performed for the winding start lead 16, thereby assembling an insulating tube 25 to the winding start lead 16. As a result, the distal portion of the winding start lead 16 is joined, for example by welding, to the terminal 22.

Resin Impregnation Process

An impregnation material 40, which is made up of a resin, is applied to each of the winding start and winding end leads 16 of the field coil 6.

More specifically, as shown in FIG. 9, a suitable amount of the impregnation material 40 is filled between the lead 16, the insulating tube 25, the first and second hook portions 17 and 18, the first and second restricting portions 51 and 52, and the flange 14, thereby bonding them together. Consequently, the lead 16 can be reliably secured.

At the same time, a portion of the lead 16, which axially extends between the second hook portion 18 and the shoulder portion 24 of the pole core 3, has no impregnation material applied thereon. Consequently, the portion can absorb vibration transmitted from the pole core 3 to the lead 16, thereby reducing tensile stress induced in the lead 16.

According to the present embodiment, the same advantages as according to the previous embodiments can be achieved.

In addition, according to the present embodiment, since the insulating tube 25 is put into the passage 64 of the second hook portion 18 with deformation thereof, it can be reliably hooked in the passage 64. Further, after being deformed, the insulating tube 25 has an opposite pair of wide side surfaces and an opposite pair of narrow side surfaces. On the wide side surfaces, there are applied an increased amount of the resin impregnation material 40, increasing the bonding strength. On the other hand, on the narrow side surfaces, there are applied only a small amount of the resin impregnation material 40, securing the vibration-absorbing capability.

While the above particular embodiments of the present invention have been shown and described, it will be understood by those skilled in the art that various modifications, changes, and improvements may be made without departing from the spirit of the invention.

For example, in the previous embodiments, the present invention is applied to the rotor 1 which includes the single pair of Lundell-type pole cores 3 and 4. However, the present invention may also be applied to a tandem rotor which includes a plurality of pairs of Lundell-type pole cores that are arranged in tandem on a single shaft.

What is claimed is:

1. A rotor for a rotating electrical machine, the rotor comprising:
    a shaft;
    a pair of pole cores press-fit on the shaft;
    a terminal provided on the shaft;
    an insulating bobbin mounted on the pole cores, the insulating bobbin having a cylindrical body and a pair of flanges that extend radially outward from opposite axial ends of the body, respectively; and
    a field coil having a winding portion and a lead, the winding portion being wound around the body of the insulating bobbin, the lead having a proximal portion, a distal portion, and an intermediate portion between the proximal and distal portions, the proximal portion extending from the winding portion of the field coil, the distal portion being connected to the terminal,
    wherein
    one of the flanges of the insulating bobbin is formed with a first hook portion and a second hook portion,
    the first hook portion directs the lead both against a winding direction of the field coil and radially inward, the first hook portion having a first groove through which the lead extends, the first groove having its open end on a radially outer periphery of the first hook portion and its closed end positioned radially inward of the open end, the first hook portion having an end of the proximal portion of the lead, which is away from the winding portion of the field coil, hooked in the first groove, and
    the second hook portion directs the lead axially outward, the second hook portion having a second groove through which the lead extends, the second groove having its open end on a radially inner periphery of the second hook portion, its closed end positioned radially outward of the open end, and a neck between the open and closed ends of the second groove, the second hook portion having part of the intermediate portion of the lead hooked in the second groove between the neck and closed end of the second groove.

2. The rotor as set forth in claim 1, further comprising an insulating tube that is put on the intermediate portion of the lead, and hooked in the second groove of the second hook portion along with the part of the intermediate portion,
    wherein the neck of the second groove has a width that is less than an outside diameter of the insulating tube, but is greater than or equal to the sum of a diameter of the lead and twice a thickness of the insulating tube.

3. The rotor as set forth in claim 1, wherein the one of the flanges is further formed with a guiding portion that guides the intermediate portion of the lead to extend from the first hook portion to the second hook portion with contact between the guiding portion and the intermediate portion.

4. The rotor as set forth in claim 1, wherein the first and second hook portions are axially spaced from each other by a sufficiently large distance so that the lead can be turned between the first and second hook portions to change its extending direction.

5. The rotor as set forth in claim 1, further comprising an insulating tube that is put on the intermediate portion of the lead,
    wherein the first groove of the first hook portion has a width that is less than an outside diameter of the insulating tube, but is greater than a diameter of the lead.

6. The rotor as set forth in claim 1, wherein the pole cores are of Lundell-type and each has a plurality of claw portions,
    the first and second hook portions are located in a V-shaped groove formed between an adjacent pair of the claw portions of one of the pole cores, and
    the intermediate portion of the lead, which is hooked by the second hook portion, is positioned radially outward of a root of the V-shaped groove with a radial gap between itself and the root.

7. A rotor for a rotating electrical machine, the rotor comprising:
    a shaft;
    a pair of pole cores press-fit on the shaft;
    a terminal provided on the shaft;
    an insulating bobbin mounted on the pole cores, the insulating bobbin having a cylindrical body and a pair of flanges that extend radially outward from opposite axial ends of the body, respectively;
    a field coil having a winding portion and a lead, the winding portion being wound around the body of the insulating bobbin, the lead having a proximal portion, a distal portion, and an intermediate portion between the proximal and distal portions, the proximal portion extending from the winding portion of the field coil, the distal portion being connected to the terminal; and
    an insulating tube covering the intermediate portion of the lead of the field coil,
    wherein
    one of the flanges of the insulating bobbin is formed with a first hook portion and a second hook portion,
    the first hook portion directs the proximal portion of the lead both radially inward and axially outward, the first hook portion having a first groove through which the lead extends, the first groove having its open end on a radially inner periphery of the first hook portion and its closed end positioned radially outward of the open end, the first hook portion having an end of the proximal portion of the lead, which is away from the winding portion of the field coil, hooked in the first groove, and
    the second hook portion is located with a predetermined axial gap between the first and second hook portions to direct the intermediate portion of the lead, which is covered by the insulating tube, axially outward, the second hook portion having a second groove through which the lead extends, the second groove having its open end on a radially inner periphery of the second hook portion and its closed end positioned radially outward of the open end, the second hook portion having part of the insulating tube hooked in the second groove.

8. The rotor as set forth in claim 7, wherein the one of the flanges is further formed with first and second restricting portions that face each other with a gap formed therebetween,
    the first and second restricting portions together restrict movement of the proximal portion of the lead which extends through the gap between the first and second restricting portions to the first groove of the first hook portion.

9. The rotor as set forth in claim 8, wherein the first restricting portion is positioned forward in a winding direction of the field coil from the second restricting portion.

10. The rotor as set forth in claim 8, wherein the lead is turned from the winding direction of the field coil to an axial direction of the insulating bobbin making contact with the first restricting portion on the outside of the turn and with the second restricting portion on the inside of the turn.

11. The rotor as set forth in claim 8, wherein the second restricting portion tapers both in a direction opposite to a winding direction of the field coil and in a radially inward direction of the insulating bobbin.

12. The rotor as set forth in claim 8, wherein a clearance between the first and second restricting portions is greater than a diameter of the lead, the clearance being defined as the distance between first and second hypothetical lines on a plane perpendicular to a radial direction of the insulating bobbin, the first hypothetical line extending on the plane through both an edge of the second restricting portion, on which the lead is turned, and an edge of the first hook portion which faces the second restricting portion, the second hypothetical line extending on the plane through an edge of the first restricting portion, which faces the first hook portion, and parallel to the first hypothetical line.

13. The rotor as set forth in claim 7, wherein the first groove of the first hook portion has a width that is less than an outside diameter of the insulating tube, but is greater than a diameter of the lead.

14. The rotor as set forth in claim 7, wherein the pole cores are of Lundell-type and each has a plurality of claw portions,
the first and second hook portions are located in a V-shaped groove formed between an adjacent pair of the claw portions of one of the pole cores, and
the insulating tube, which is hooked in the second groove of the second hook portion with the intermediate portion of the lead inserted therein, is positioned radially outward of a root of the V-shaped groove with a radial gap between itself and the root.

15. The rotor as set forth in claim 7, wherein the second groove has a width equal to the sum of a diameter of the lead and twice a thickness of the insulating tube.

16. The rotor as set forth in claim 7, wherein the second groove has a width that is less than or equal to an outside diameter of the insulating tube, but is greater than the sum of a diameter of the lead and twice a thickness of the insulating tube.

17. The rotor as set forth in claim 7, wherein the axial gap between the first and second hook portions is filled with a resin impregnation material.

18. The rotor as set forth in claim 7, wherein the open end of each of the first and second grooves is positioned forward in a winding direction of the field coil from the closed end of the same.

19. The rotor as set forth in claim 7, wherein each of the first and second grooves has a cross section tapering from its open end to the closed end.

20. The rotor as set forth in claim 7, wherein the pole cores are of Lundell-type and each has a plurality of claw portions,
the one of the flanges has a V-shaped wall portion that is fit in a V-shaped groove formed between an adjacent pair of the claw portions of one of the pole cores, and
both the first and second hook portions are formed to protrude from an inner surface of the wall portion.

21. The rotor as set forth in claim 7, wherein a portion of the insulating tube, which is held in the second groove of the second hook portion, is located on or radially outward of a hypothetical line,
the hypothetical line extending through both a contact point between the insulating tube and a shoulder portion of a corresponding one of the pole cores and an axially-center and radially-inmost point on the portion of the insulating tube held in the second groove.

22. A rotor for a rotating electrical machine, the rotor comprising:
a shaft;
a pair of pole cores press-fit on the shaft;
a terminal provided on the shaft;
an insulating bobbin mounted on the pole cores, the insulating bobbin having a cylindrical body and a pair of flanges that extend radially outward from opposite axial ends of the body, respectively;
a field coil having a winding portion and a lead, the winding portion being wound around the body of the insulating bobbin, the lead having a proximal portion, a distal portion, and an intermediate portion between the proximal and distal portions, the proximal portion extending from the winding portion of the field coil, the distal portion being connected to the terminal; and
an insulating tube covering the intermediate portion of the lead of the field coil,
wherein
one of the flanges of the insulating bobbin is formed with a first hook portion and a second hook portion,
the first hook portion directs the proximal portion of the lead both radially inward and axially outward, the first hook portion having a groove through which the lead extends, the groove having its open end on a radially inner periphery of the first hook portion and its closed end positioned radially outward of the open end, the first hook portion having an end of the proximal portion of the lead, which is away from the winding portion of the field coil, hooked in the groove, and
the second hook portion has formed therein a passage to direct the intermediate portion of the lead, which is covered by the insulating tube, axially outward through the passage, the second hook portion having part of the insulating tube hooked in the passage.

23. The rotor as set forth in claim 22, wherein the passage of the second hook portion has a width that is less than or equal to an outside diameter of the insulating tube, but is greater than the sum of a diameter of the lead and twice a thickness of the insulating tube.

24. The rotor as set forth in claim 22, wherein both the groove of the first hook portion and the passage of the second hook portion are filled with a resin impregnation material.

25. A method of manufacturing a rotor for a rotating electrical machine,
wherein the rotor comprises:
a shaft;
a pair of pole cores press-fit on the shaft;
an insulating bobbin mounted on the pole cores, the insulating bobbin having a cylindrical body and a pair of flanges that extend radially outward from opposite axial ends of the body, respectively; and
a field coil having a winding start lead, a winding portion wound around the body of the insulating bobbin, and a winding end lead,
the method comprising:
a coil winding step in which: movement of the winding start lead of the field coil is restricted by a winding start-side restricting portion of the insulating bobbin, the winding portion of the field coil is wound around the body of the insulating bobbin, and movement of the winding end lead of the field coil is restricted by a winding end-side restricting portion of the insulating bobbin; and an insulating tube assembly step in which: an insulating tube is put on each of the leads of the field coil, each of the leads is held, moved to a hook portion, and put into a groove formed in the hook portion.

26. The method as set forth in claim 25, wherein in the insulating tube assembly step, the insulating tube is held, moved to the hook portion, and put into the groove along with the lead inserted therein.

27. The method as set forth in claim 26, wherein in the insulating tube assembly step, the insulating tube is pushed into the groove while being deformed.

28. The method as set forth in claim 26, wherein in the insulating tube assembly step, the insulating tube is first deformed, and then put into the groove keeping the deformed state of the insulating tube.

* * * * *